US010200560B2

United States Patent
Kong et al.

(10) Patent No.: US 10,200,560 B2
(45) Date of Patent: Feb. 5, 2019

(54) AUTOMATED SHARING OF DIGITAL IMAGES

(71) Applicant: Adobe Systems Incorporated, San Jose, CA (US)

(72) Inventors: Sarah A. Kong, Cupertino, CA (US); Chih-Yao Hsieh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 58 days.

(21) Appl. No.: 15/406,364

(22) Filed: Jan. 13, 2017

(65) Prior Publication Data

US 2018/0205848 A1 Jul. 19, 2018

(51) Int. Cl.
*H04N 1/00* (2006.01)
*H04N 1/21* (2006.01)
*G06K 9/00* (2006.01)

(52) U.S. Cl.
CPC ....... *H04N 1/2187* (2013.01); *G06K 9/00228* (2013.01); *G06K 9/00295* (2013.01); *H04N 1/00244* (2013.01); *H04N 2201/0084* (2013.01)

(58) Field of Classification Search
CPC ......... H04N 2201/0084; H04N 1/2187; G06K 9/00244; G06K 9/00228; G06K 9/00295
USPC ....................................................... 382/118
See application file for complete search history.

(56) References Cited

U.S. PATENT DOCUMENTS

| | | | | |
|---|---|---|---|---|
| 8,861,804 B1* | 10/2014 | Johnson | ............. | G06K 9/00221 382/118 |
| 2012/0027256 A1* | 2/2012 | Kiyohara | .......... | G06F 17/30029 382/103 |
| 2015/0227782 A1* | 8/2015 | Salvador | ............ | G06K 9/00221 382/118 |
| 2018/0103006 A1* | 4/2018 | Steiner | .................... | H04L 51/32 |

\* cited by examiner

*Primary Examiner* — Ping Y Hsieh
(74) *Attorney, Agent, or Firm* — Wolfe-SBMC

(57) ABSTRACT

Automated sharing of digital images is described. In example implementations, a computing device, such as a smart phone, captures a digital image depicting multiple faces of multiple persons included in the digital image. The computing device is capable of automatically distributing a copy of the digital image to the subjects of the digital image. To do so, a digital image sharing module determines a person identifier using facial detection and recognition. The person identifier, which can be derived from facial characteristics, is used to search a contact information database and find a matching entry. The matching entry includes contact information associated with the person in the digital image. The sharing module transmits a copy of the digital image to the person using the contact information. The digital image sharing module can also display a sharing status indicator indicative of whether the digital image can be, or has been, transmitted automatically.

20 Claims, 15 Drawing Sheets

AUTOMATED SHARING OF DIGITAL IMAGES

BACKGROUND

It has been said that the best camera for taking a photograph is the one that you have with you. Perhaps this notion explains why mobile phones have become the most common camera for taking photographs, which are referred to herein as digital images. Many people carry a smart phone having a camera feature with them at all times, so a camera is literally always at hand. Further, the quality of cameras on smart phones has improved to such a degree that these cameras now rival compact point-and-shoot cameras from just a few years ago. These two factors have contributed to a dramatic increase in the number of digital images that people take in a variety of circumstances on a daily basis. Of the various potential scenes that can be a target of a digital image, one of the more common is a group of people.

Group digital images are digital images of a scene that includes two or more persons. Individuals take group digital images in two major ways. First, a selfie digital image can be taken in which one of the subjects of the group digital image is operating the camera. Second, a traditional digital image can be taken in which a person that is not a subject of the group digital image operates the camera. Further, a group digital image can be taken in a hybrid manner in which a camera having a timer function is used so as to include the camera operator as a subject of the group digital image. Regardless of the manner used for a camera to take a digital image, the end result is that a single camera possesses the group digital image.

Thus, a scene is digitally memorialized using one person's camera. This situation presents a problem because a group digital image by definition includes multiple people. Although the group digital image is stored on only a single person's smart phone, each subject in the group digital image typically wants to possess the digital memorialization of the scene. To ensure that each subject will possess his or her own digital memorialization of the group scene, each subject's smart phone is often used to separately take a digital image of the group. This is a lengthy process that usually inconveniences not only the subjects of the group digital image, but also proximate bystanders.

In a typical scenario, a scene with a group of people is photographed using a first person's camera. Then a second person's camera is used to capture the scene. This is repeated until each person's camera is used. However, it takes time to switch cameras and have everyone get repositioned for taking another digital image of the scene. The overall time period can be significantly lengthened if multiple attempts are required with each camera to secure a high-quality photographic result that is well-framed, that is in-focus, that has good facial expressions for each subject, and so forth.

Furthermore, people in the vicinity of the photographic scene are usually inconvenienced. The group of people being photographed, in conjunction with the camera operator and the space in between, tend to occupy a significant area. Together this set of people will usually block access to a walkway or to a view of a picturesque background. Other people therefore often have to wait, while the digital images are being repeatedly taken, to use the walkway or for an opportunity in front of the background. Or the other people have to try to navigate around the set of people currently taking the digital image. Additionally, the subjects of the group digital image will sometimes ask a third party, such as a waitperson at a restaurant, to cycle through the cameras of each of the subjects. This inconveniences the third party.

Because of their ubiquity and ever-improving camera quality, smart phones are adept at taking digital images on a daily basis in a variety of different circumstances, including group digital images. Unfortunately, the traditional approach to providing each subject of a group digital image with a digital memorialization of the multi-person scene is lengthy and inconvenient for both the subjects and any proximate bystanders.

SUMMARY

Automated sharing of digital images is described. Techniques and systems described herein enable digital images to be shared with subjects of the digital images without inconveniencing the camera operator or bystanders near the scene being photographed. Generally, a computing device, such as a smart phone, includes a camera feature capable of taking a digital image of one or more persons that are the subjects of the digital image. The computing device can identify the persons present in the digital image using facial recognition. Contact information respectively associated with the identified persons can be used to send a copy of the digital image to each of the subjects.

In example implementations, a digital image depicting a face of at least one person is obtained. Operations supporting the automated sharing of the digital image can be conditioned on a state, such as active or inactive, of an automated sharing feature that is established by a digital image sharing setting. If active, a digital image sharing module detects the face depicted in the digital image and recognizes the person based on the detected face. A person identifier corresponding to the person is determined based on the face as recognized in the digital image. The person identifier can be derived from facial characteristics extracted from the face and can be realized using a version of the facial characteristics or an alphanumeric value corresponding thereto. The digital image sharing module ascertains contact information associated with the person based on the person identifier. A copy of the digital image is transmitted to a subject computing device corresponding to the person using the contact information.

In some implementations, the digital image sharing module displays a sharing status indicator indicative of a current state of sharing with regard to the person in the digital image. Example sharing statuses include successfully ascertaining contact information, failing to ascertain contact information, digital image ready to transmit, digital image transmitted, and combinations thereof. The digital image sharing module can be resident and executing at an end-user computing device, such as smart phone. Alternatively, the digital image sharing module can be executing in a distributed fashion across an end-user computing device and one or more servers that provide cloud computing functionality. In either case, the transmitted copy of the digital image can be provided directly to a digital image sharing module that is executing on the subject computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. Items represented in the figures may

DETAILED DESCRIPTION

Overview

Figure 1:
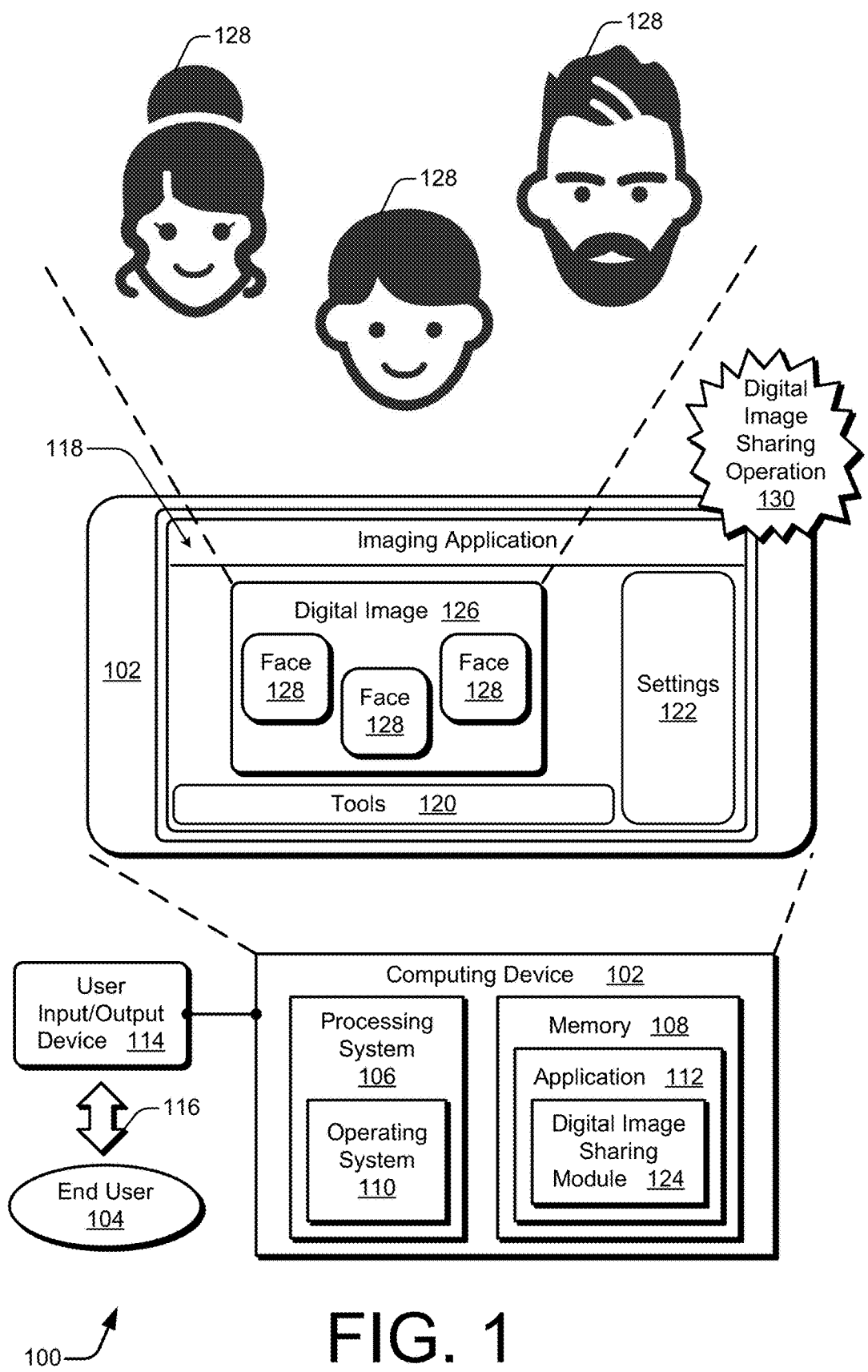
FIG. 1 illustrates an environment having a system for example implementations that are operable to realize automated sharing of digital images with a digital image sharing module.

When a group of friends or family get together, a group digital image is often taken to memorialize the event. Each subject appearing in the group digital image typically wants to possess a personal copy of the digital image. To do so, each subject traditionally has his or her own personal camera directly capture the scene of the collective group. Unfortunately, this traditional approach extends the photographic session and usually inconveniences participants and bystanders alike. However, with the advent of digital communication channels, such as electronic messaging and email, another approach has been developed.

This conventional approach enables a single computing device with a camera feature, such as a smart phone, to capture a scene including multiple people and then transmit a copy of the resulting digital image to the respective smart phones of the multiple subjects of the photographed scene. Unfortunately, this conventional approach with a single image-capturing smart phone also has a number of attendant problems. For example, the process of sharing the group digital image with a number of different subjects is time-consuming and tedious for the operator of the single smart phone. This is especially true if the operator endeavors to send a copy of the digital image separately to each individual subject, such as through multimedia messaging. In fact, the operator often forgets to ever forward the group digital image, so the other subjects never receive a copy.

As another example, the operator of the smart phone that has the original version of the group digital image can choose to share the digital image using a social medium platform. However, the copy of the group digital image that is posted to a social network almost invariably gets compressed to a lower-resolution version of the original image. Furthermore, limiting the sharing of the group digital image to merely the persons present in the scene involves additional time and effort, if the social network even permits this kind of targeted sharing. Consequently, although the group digital image may be more likely to be shared via a social medium platform as compared to using individual private transmissions, image quality and privacy can both be adversely impacted with social network sharing.

Thus, because of their convenience and ever-improving camera quality, smart phones have become the go-to camera for taking digital images on a daily basis in a variety of different circumstances, including for scenes having a group of friends or family. Conventional approaches for providing each subject of a group digital image with a digitized memorialization of the photographed scene include taking a different digital image with each subject's camera and manually distributing copies of a single digital image. Unfortunately, these conventional approaches are unsatisfactory for the reasons presented above, such as being lengthy, inconvenient, tedious, and unreliable.

In contrast, automated sharing of digital images is described herein. In an example implementation, a computing device, such as a smart phone, captures a digital image that depicts multiple faces of multiple persons appearing in the digital image. The computing device is capable of automatically distributing a copy of the digital image to the subjects of the digital image. To do so, a digital image sharing module determines a person identifier using facial detection and facial recognition on each face depicted in the digital image. The person identifier, which can be derived from facial characteristics, is used to search a contact information database and find a matching entry. The matching entry includes contact information associated with the person in the digital image. The digital image sharing module transmits a copy of the digital image to the person using the associated contact information. This process can be applied to each depicted face.

In some example implementations, the digital image sharing module includes four modules: a digital image obtainment module, a person identification module, a contact information ascertainment module, and a digital image distribution module. Initially, the digital image obtainment module obtains a digital image depicting a face of at least one person. The digital image can be obtained directly or indirectly from camera hardware or from a remote source via one or more networks. Although multiple persons each having multiple faces may be included in a given digital image, the example below is described for the sake of clarity in the context of a digital image depicting one face for a single person.

The person identification module determines a person identifier corresponding to the person based on a visual appearance of the face. For example, after detecting the presence of the face, the person identification module can perform a facial recognition operation on the face to extract facial characteristics representative of a unique combination of physical attributes. The person identifier can comprise, for instance, the actual facial characteristics or an alphanumeric value assigned thereto. In an alternative example, the person identification module can determine the person identifier by sending a request including the digital image to a remote cloud resource and receiving in return the person identifier.

The contact information ascertainment module ascertains an instance of contact information associated with the person based on the person identifier that has been determined to correspond to the person. The person identifier can be used to search a contact information database and to find an entry having a matching person identifier. The contact information linked to the matching person identifier in the database includes data enabling the digital image to be transmitted to a subject computing device corresponding to the person in the digital image. Examples of contact information include a mobile phone number, a messaging alias, an account name of a cloud service, a user identification of an electronic ecosystem, an email address, or some combination thereof.

The digital image distribution module transmits a copy of the digital image to the subject computing device corresponding to the person using the instance of contact information that is associated with the person. The digital image distribution module transmits the copy of the digital image by, for instance, texting the copy to a mobile phone number included in the contact information. Alternatively, the digital image distribution module can transmit the copy of the digital image to a digital image sharing module resident on a computing device associated with the person. If a fully-automated mode setting is active, each of these four modules can perform a respective operation without contemporaneous input or control by an end user operating an end-user computing device having a camera feature. On the other hand, if a partially-automated mode setting is active, the overall digital image sharing module is capable of performing the various operations described above, but performance of one or more of the identification, ascertainment, or distribution operations is contingent on contemporaneous authorization by the end user.

The digital image sharing module can also include a sharing status indication module or a facial training module. A sharing status indication module visually indicates a current status with respect to automated sharing of the digital image with at least one person of the multiple persons included in a digital image. For instance, a sharing status indicator for a successful ascertainment of contact information can be displayed as a solid-lined rectangle around the face of the person, and a sharing status indicator for an unsuccessful ascertainment of contact information can be displayed as a broken-lined rectangle around the face of the person. Other colors, shapes, icons, and so forth can additionally or alternatively be used. A facial training module receives and processes user control signals that are based on user input and are indicative of which faces in the digital images of an album correspond to which instances of contact information. More specifically, a user control signal is indicative of a linkage between a face of a particular person and contact information corresponding to an associated subject computing device. The facial training module links a person identifier corresponding to the particular person to the contact information in a contact information database.

In these manners, a digital image sharing module can distribute in an automated manner copies of a digital image to each person who appears in the digital image. The automated sharing is quick and easy for the operator of a computing device that is serving as the camera to capture the digital image. The automated sharing of digital images also reduces, if not eliminates, inconveniences to bystanders who are proximate to the scene being captured. Furthermore, the subjects in the digital image that do not own the computing device capturing the digital image can feel confident about receiving a copy of the digital image.

In the following discussion, after some example terminology is set forth, an example environment is described that may employ the techniques described herein. Example implementations of systems, apparatuses, and techniques are then described, followed by a section explaining example procedural implementations. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, implementations presented herein. Some terms are further elucidated using one or more examples.

A "digital image" refers to a visually-discernable memorialization of a scene that is captured using a camera. The digital image includes data that retains a version of the scene and can be used to generate a visible reproduction of the scene. A digital image, such as a photograph, can include one or more persons having a visual appearance.

A "visual appearance" refers to a visible component of an element of a digital image. A "face" of a person has a visual appearance that can be analyzed to identify the person belonging to the face. A face has one or more facial characteristics representative of a unique combination of physical attributes.

A "person identifier" refers to an identification that corresponds to a person that is derived from a visual appearance of some aspect of the person, such as the face of the person. The person identifier can comprise raw facial characteristics, processed facial characteristics, a derivation or combination of facial characteristics, an alphanumeric value assigned to such characteristics, some combination thereof, and so forth.

"Contact information" refers to data that enables communication with a person associated with the contact information. Contact information is typically tied to one or more computing devices corresponding to, such as owned or possessed by, the person. Examples of contact information include a mobile phone number, a messaging alias, an account name of a cloud service, a user identification of an electronic ecosystem, an email address, or some combination thereof.

A "subject computing device" refers to a computing device that corresponds to a person that is a subject of a digital image. Communications to a subject computing device can be made using an instance of contact information. Examples of a subject computing device include a smart phone, a desktop computer, and a server computer of a cloud service.

An "automated sharing feature" for a digital image refers to a capability of a computing device, application, or module thereof to ascertain contact information for persons appearing in the digital image if the automated sharing feature is active. The contact information is ascertained based on the visual appearance of the person. For a fully-automated sharing feature, the digital image is shared without a contemporaneous end-user command. For a partially-automated sharing feature, the transmission of a digital image is conditioned on a contemporaneous authorization by the end user Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations that are operable to realize automated sharing of digital images with a digital image sharing module 124. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the digital image sharing module 124. Example implementations for the computing device 102 and the digital image sharing module 124 are described further below in this section. For the illustrated example environment, FIG. 1 shows an end user 104 and a user interaction between the end user 104 and the user I/O device 114 that produces a user control signal 116. The environment further includes a digital image 126 having at least one face 128. Although the digital image 126 is shown depicting three faces 128, a digital image may include more or fewer faces 128.

As shown on a display screen associated with the computing device 102, the application 112 may be realized as some kind of imaging application, such as a photograph editing application, a photograph organization application, a camera application, a social networking application, a cloud storage application, or some combination thereof. The imaging application processes or displays a digital image 126 responsive to user input realized as the user control signal 116. For example, the imaging application empowers the end user 104 to have the computing device 102 obtain the digital image 126 via a camera feature or share the digital image 126 in an automated manner with one or more persons whose faces 128 appear in the digital image 126.

The computing device 102 provides a user interface 118 that presents output to the end user 104 or accepts input from the end user 104. To enable the end user 104 to operate the computing device 102 for automated digital image sharing, the imaging application provides a number of tools 120. Examples of tools 120 include digital image capturing, face selection, image touch-up, and data entry. To enable the end user 104 to easily see a current condition or property of a digital image 126 or a current state of a tool 120, the imaging application can display a number of settings 122 constantly or on-demand. Examples of settings 122 include image capture options, whether automated sharing is active, types of automated sharing on a per-person basis, and how sharing status indicators are displayed. The imaging application can also provide options—such as menus or toggle switches—to change the settings 122. However, the tools 120 or the settings 122 can be arranged or presented in alternative manners. Although shown in the context of a computing device that enables touch-screen interaction, the tools 120, the settings 122, other features that are described herein, etc. of the imaging application can alternatively be utilized via a mouse, a touchpad, voice interaction, motion input, some combination thereof, and so forth.

Generally, the digital image sharing module 124 can perform an image sharing operation 130 with regard to the digital image 126. The digital image sharing operation 130 is performed on behalf of the end user 104 and for the benefit of persons whose faces 128 appear in the digital image 126. As described herein, the digital image sharing module 124 ascertains contact information for each person appearing in the digital image 126. The digital image sharing module 124 uses the contact information to distribute a copy of the digital image 126 to a subject computing device (not shown in FIG. 1) of each subject present in the digital image 126. An example digital image sharing operation 130 for a digital image 126 is described herein with reference to FIG. 2.

The computing device 102 can be implemented as any suitable type of computing device. Examples of end-user implementations for the computing device 102 include a desktop computer, a laptop or notebook computer, a mobile device (e.g., assuming a handheld configuration such as a tablet, a phablet, or a mobile phone—which is depicted in FIG. 1), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 15. The processing system 106 is representative of functionality to perform operations through execution of instructions stored in the memory 108. Thus, execution of the instructions by the processing system 106 causes the computing device 102 to perform operations that are described herein. Although illustrated as two separate components, functionality of the processing system 106 and the memory 108 may be combined into one component (e.g., on an application specific integrated circuit (ASIC) or as instructions are loaded from the memory onto a processor) or may be further divided into a greater number of components. Examples of a user I/O device 114 include a keyboard, a mouse, a touchpad, an accelerometer, a touch screen, a microphone, a camera, a display device such as a screen or projector, a speaker, or some combination thereof. The user I/O device 114 may be separate from or integrated with the computing device 102. The computing device 102 is further illustrated as including an operating system 110. The operating system 110 is configured to abstract underlying hardware functionality of the computing device 102 to the application 112 that is executable on the computing device 102.

In example implementations, the digital image sharing module 124 is located at or executing on the computing device 102, such as by being part of the application 112 or the operating system 110. The digital image sharing module 124 represents functionality to implement schemes and techniques for automated digital image sharing using facial recognition and linked contact information as described herein. The digital image sharing module 124 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. As described herein with reference to FIG. 15, the digital image sharing module 124 may alternatively be fully or partially implemented as a web or cloud based digital-image-handling service, such as one that facilitates the editing, storing, or organizing of photographs.

Systems and Techniques

Figure 2:
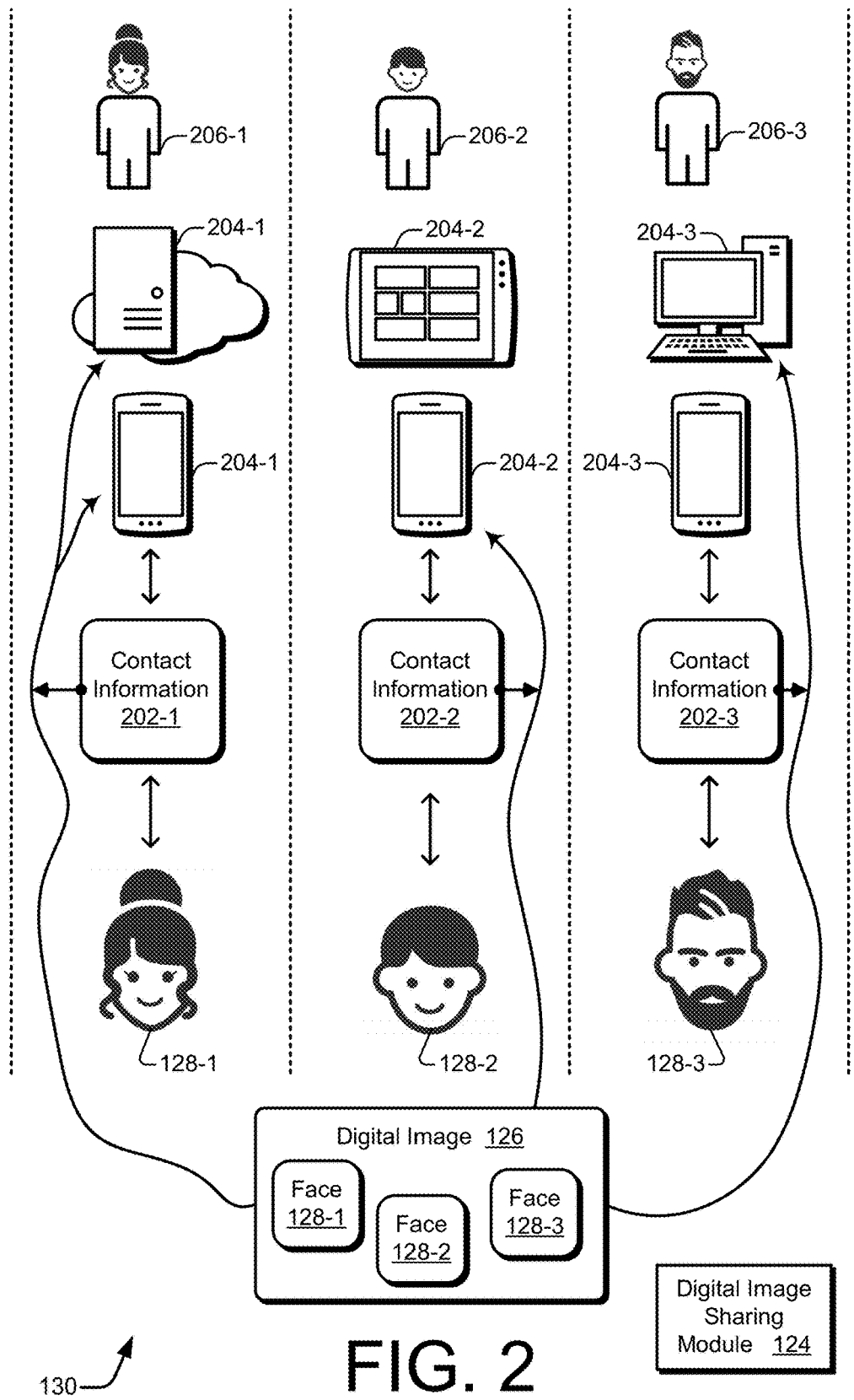
FIG. 2 illustrates an example digital image sharing operation for subjects of the digital image using the digital image sharing module.

FIG. 2 illustrates an example digital image sharing operation 130 for subjects of the digital image 126 using the digital image sharing module 124. As shown, the digital image sharing operation 130 involves multiple persons 206, multiple subject computing devices 204, multiple instances of contact information 202, and multiple faces 128. FIG. 2 also includes the digital image sharing module 124 and the digital image 126. Each respective person 206 is associated with a respective instance of contact information 202 and corresponds to at least one subject computing device 204. Although not explicitly so depicted in FIG. 2, the digital image 126 includes the multiple persons 206 as subjects of the digital image and depicts a respective face 128 of the multiple faces 128 for each respective person 206 included in the digital image 126.

More specifically, a first person 206-1 corresponds to first subject computing devices 204-1 and is associated with a first instance of contact information 202-1. The first person 206-1 has a first face 128-1 depicted in the digital image 126. Similarly, a second person 206-2 corresponds to second subject computing devices 204-2 and is associated with a second instance of contact information 202-2. The second person 206-2 has a second face 128-2 depicted in the digital image 126. A third person 206-3 corresponds to third subject computing devices 204-3 and is associated with a third instance of contact information 202-3. The third person 206-3 has a third face 128-3 depicted in the digital image 126.

The contact information 202, such as an email address or a messaging alias, enables the digital image sharing module 124 to transmit the digital image 126 to a destination subject computing device 204. Each person 206 owns, is granted access to, is authorized to use, leases or licenses a portion of, or otherwise corresponds to at least one subject computing device 204. As shown, each person 206 corresponds to a smart phone type of subject computing device 204. The first person 206-1 also corresponds to a server type of subject computing device 204-1, the second person 206-2 also corresponds to a tablet type of subject computing device 204-2, and the third person 206-3 also corresponds to a desktop type of subject computing device 204-3.

By way of example, the first instance of contact information 202-1 includes a mobile number for the smart phone and an account name for a cloud service hosted by the server computer. The server computer can be, for instance, part of a data center that provides a repository for digital images or other files to facilitate cloud storage backup, creative manipulation of media, collaboration between people, and so forth. Such a data center can also store emails that are used to transport digital images 126. The second instance of contact information 202-2 includes a messaging alias for a messaging application executing on the smart phone and a user identification tied to the operating system of the tablet computer. The third instance of contact information 202-3 includes an account identifier linked to the smart phone and an email address for an email account having emails that are checked on, or downloaded to, the desktop computer.

In operation, the digital image sharing module 124 distributes the digital image 126 to the multiple persons 206 based on the contact information 202. For example, in accordance with the first instance of contact information 202-1, the digital image sharing module 124 transmits a copy of the digital image 126 to the smart phone subject computing device 204-1 using the mobile number and to the server subject computing device 204-1 using the cloud service account name for the first person 206-1. The digital image sharing module 124 also transmits a copy of the digital image 126 to the smart phone subject computing device 204-2 using the messaging alias for the messaging application executing thereon after extracting the messaging alias from the second instance of contact information 202-2. The digital image sharing module 124 further emails a copy of the digital image 126 to the desktop subject computing device 204-3 using the email address retrieved from the third instance of contact information 202-3.

A digital image sharing module 124 can also be located at any of the subject computing devices 204 (not shown in FIG. 2). In such implementations, the digital image sharing module 124 of the end-user computing device 102 of FIG. 1 can transmit a copy of the digital image 126 to a digital image sharing module 124 at a subject computing device 204. The transmission can be direct from the end-user computing device 102 to the subject computing device 204, or the transmission can be indirect—such as via a cloud server that manages digital image sharing between different digital image sharing modules 124. Although specific examples for the digital image sharing operation 130 are described above with reference to FIG. 2, the digital image sharing module 124 may share the digital image 126 in alternative manners.

Figure 3:
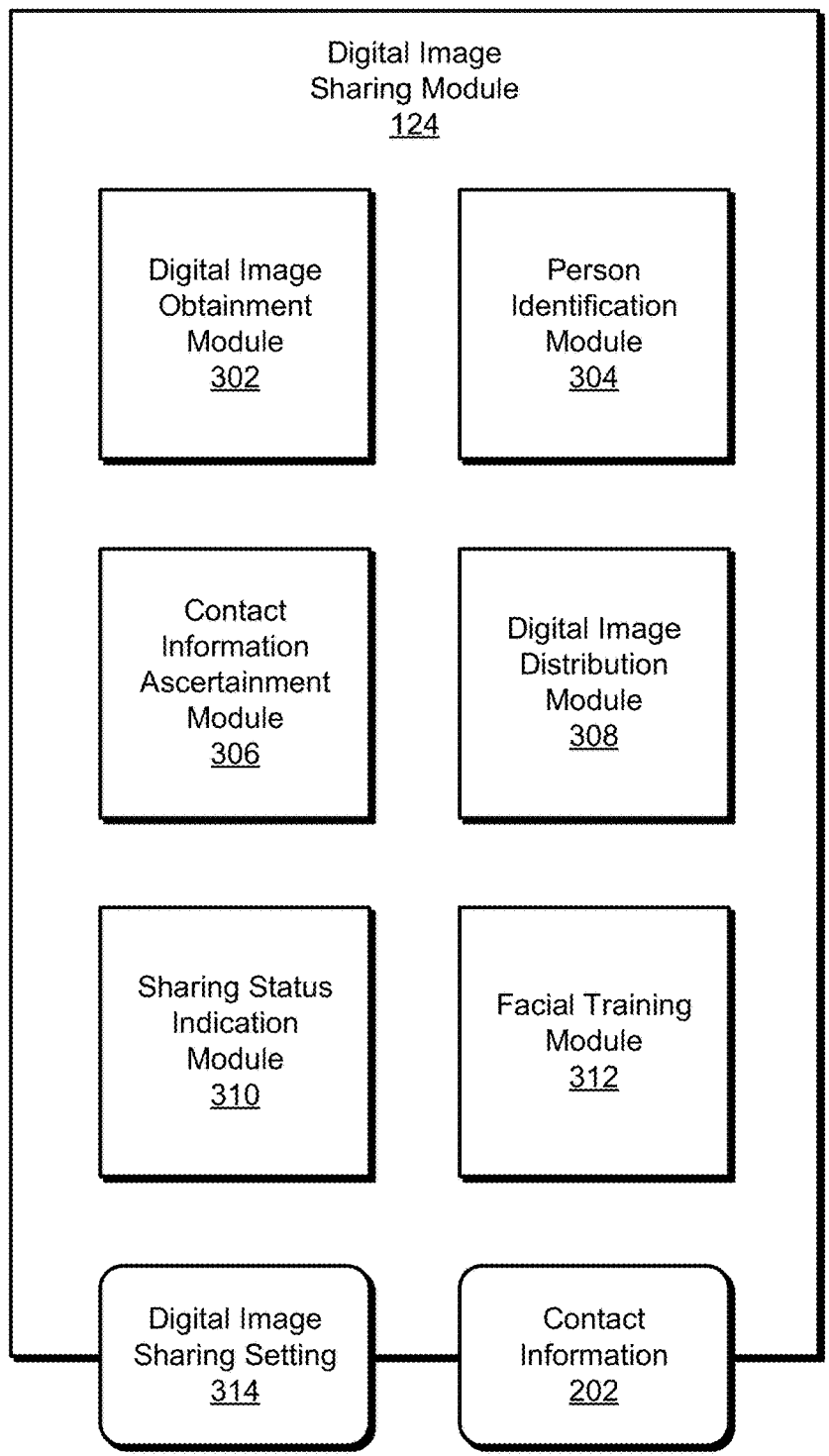
FIG. 3 illustrates an example of the digital image sharing module.

FIG. 3 illustrates an example of the digital image sharing module 124. As shown, the digital image sharing module 124 includes a digital image obtainment module 302, a person identification module 304, a contact information ascertainment module 306, a digital image distribution module 308, a sharing status indication module 310, and a facial training module 312. The digital image sharing module 124 also includes or at least has access to at least one digital image sharing setting 314 and contact information 202.

The digital image sharing setting 314 or the contact information 202 can each be separately or jointly stored as part of the digital image sharing module 124, incorporated into the operating system 110 of the computing device 102 (of FIG. 1), accessible via another application on the computing device 102, some combination thereof, and so forth. The digital image sharing setting 314 is indicative of whether an automated sharing of digital images feature is in an active state generally, whether automatically identified persons being sent a copy of a digital image is conditioned upon end-user authorization or is not dependent on such authorization, some combination thereof, and so forth. Whether transmission of a copy of a digital image is conditioned upon image-by-image end-user authorization can also be established on a per-person basis. In other words, for some people, such as close friends and family, the digital image sharing can be fully automatic for each such subject present in a digital image. For other people who are less close but are nevertheless included in an end-user's contacts listing, the subject identification and contact information ascertainment can be performed automatically, but the actual transmission is conditioned on a contemporaneous authorization by the end user.

In example implementations, the digital image obtainment module 302 obtains a digital image 126 depicting multiple faces 128 of multiple persons 206 included in the digital image 126. The person identification module 304 determines a person identifier corresponding to each respective person 206 of the multiple persons 206 based on a visual appearance of a respective face 128 of the multiple faces 128. The contact information ascertainment module 306 ascertains an instance of contact information 202 associated with each respective person 206 based on the person identifier corresponding to the respective person 206. The digital image distribution module 308 transmits a copy of the digital image 126 to a subject computing device 204 corresponding to each respective person 206 using the instance of contact information 202 associated with the respective person 206. These four modules are described below with reference to FIGS. 4-8, with FIG. 4 illustrating an example general scheme and FIGS. 5-8 illustrating respective example approaches for implementing the four individual modules 302-308.

The sharing status indication module 310 visually indicates a current status with respect to automated sharing of the digital image 126 with at least one person 206 of the multiple persons 206 included in the digital image 126. Example implementations for the sharing status indication module 310 are described below with reference to FIG. 9. The facial training module 312 receives a user control signal 116 based on user input from the end user 104 (of FIG. 1). The user control signal 116 is indicative of a linkage between a face 128 of a particular person 206 and contact information 202 corresponding to an associated subject computing device 204. The facial training module 312 links a person identifier corresponding to the particular person 206 to the contact information 202 in a contact information database. Example implementations for the facial training module 312 are described below with reference to FIG. 10.

The modules 302-312 of the digital image sharing module 124 as depicted in FIG. 3 can each be resident at or executing on an end-user computing device 102 of FIG. 1 or a subject computing device 204 of FIG. 2. Additionally or alternatively, one or more of the modules 302-312 can be resident at or executing on at least one server of a data center as part of cloud computing functionality that may interact with one or more other ones of the modules 302-312 of a digital image sharing module 124 that is located at a client-side computing device.

Figure 4:
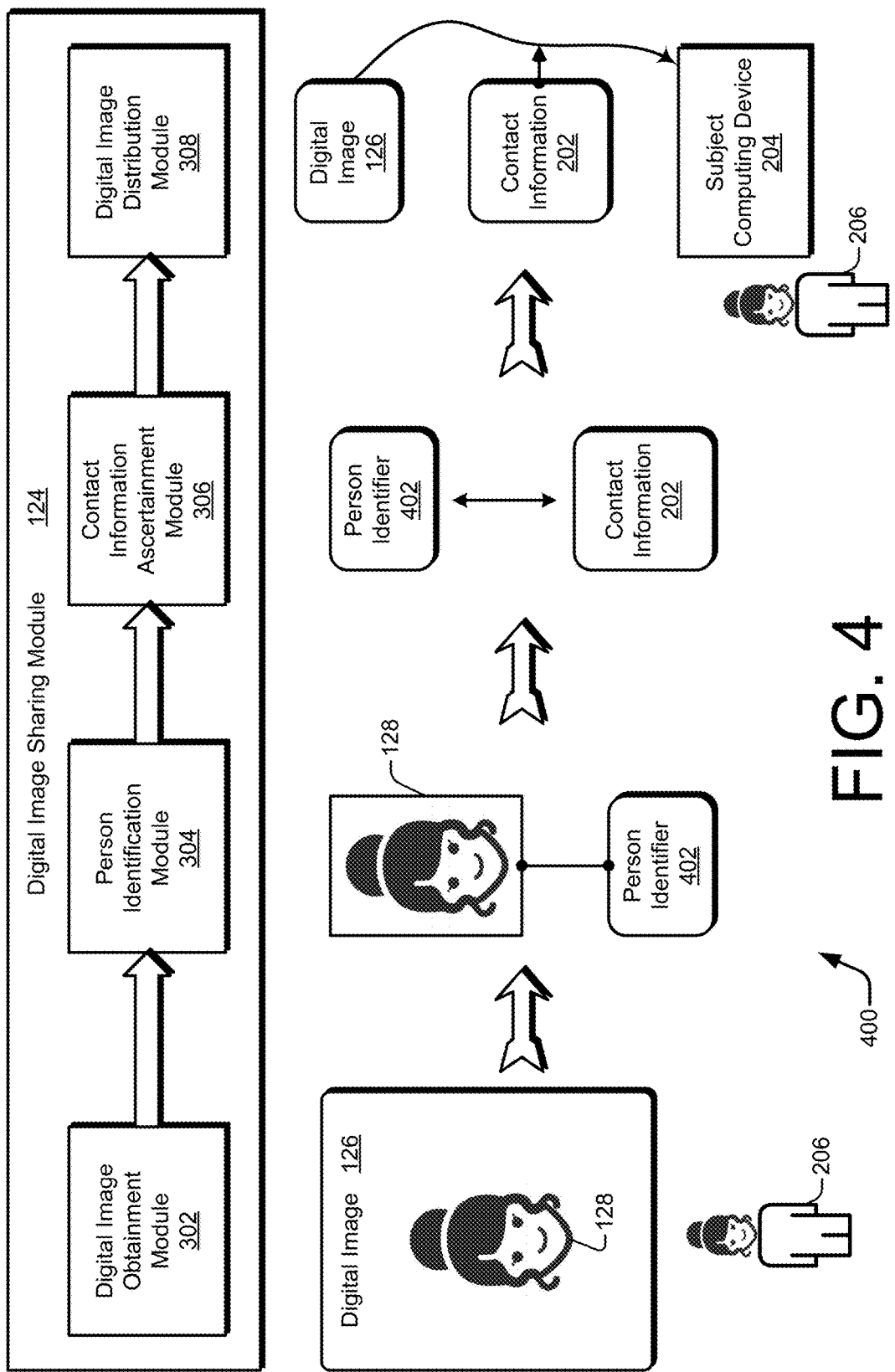
FIG. 4 illustrates an example scheme for automated sharing of digital images using four modules of the digital image sharing module.

FIG. 4 illustrates an example scheme 400 for automated sharing of digital images 126 using four modules of the digital image sharing module 124. Although multiple persons 206 having multiple faces 128 may be included in a given digital image 126, the example scheme 400 is described for the sake of clarity in the context of a single person 206 with a single face 128 being depicted in the digital image 126. The scheme 400 is described from left to right. Initially, the digital image obtainment module 302 obtains the digital image 126 depicting at least the face 128 of the person 206. The digital image 126 can be obtained directly or indirectly from camera hardware or from a remote source via one or more networks. Example implementations of the digital image obtainment module 302 are described herein with reference to FIG. 5.

The person identification module 304 determines a person identifier 402 corresponding to the person 206 based on a visual appearance of the face 128. For example, after detecting the presence of the face 128, the person identification module 304 can perform a facial recognition operation on the face 128 to extract facial characteristics representative of a unique combination of physical attributes. The person identifier 402 can comprise, for instance, the actual facial characteristics or an alphanumeric value assigned thereto. In an alternative example, the person identification module 304 can request that a remote cloud resource provide the person identifier 402 based on the digital image 126.

The contact information ascertainment module 306 ascertains an instance of contact information 202 associated with the person 206 based on the person identifier 402 that has been determined to correspond to the person 206. The person identifier 402 can be used to search a contact information database and to find an entry having a matching person identifier 402. The contact information 202 linked to the matching person identifier 402 in the database has data enabling the digital image 126 to be transmitted to a subject computing device 204. Examples of contact information for a private communication channel (e.g., as contrasted with social media postings) include a mobile phone number, a messaging alias, an account name of a cloud service, a user identification for an electronic ecosystem, an email address, or some combination thereof.

The digital image distribution module 308 transmits a copy of the digital image 126 to the subject computing device 204 corresponding to the person 206 using the instance of contact information 202 that is associated with the person 206. The digital image distribution module 308 transmits the copy of the digital image 126 by, for instance, emailing the copy to an email address included in the contact information 202. In a fully-automated mode, each of these four modules perform a respective operation without contemporaneous input or control by an end user operating an end-user computing device having a camera feature. In a partially-automated mode, the overall digital image sharing module 124 (e.g., of FIG. 3) is capable of performing the various operations illustrated in the scheme 400, but performance of one or more of the identification, ascertainment, or distribution operations is contingent on contemporaneous authorization by the end user 104.

Figure 5:
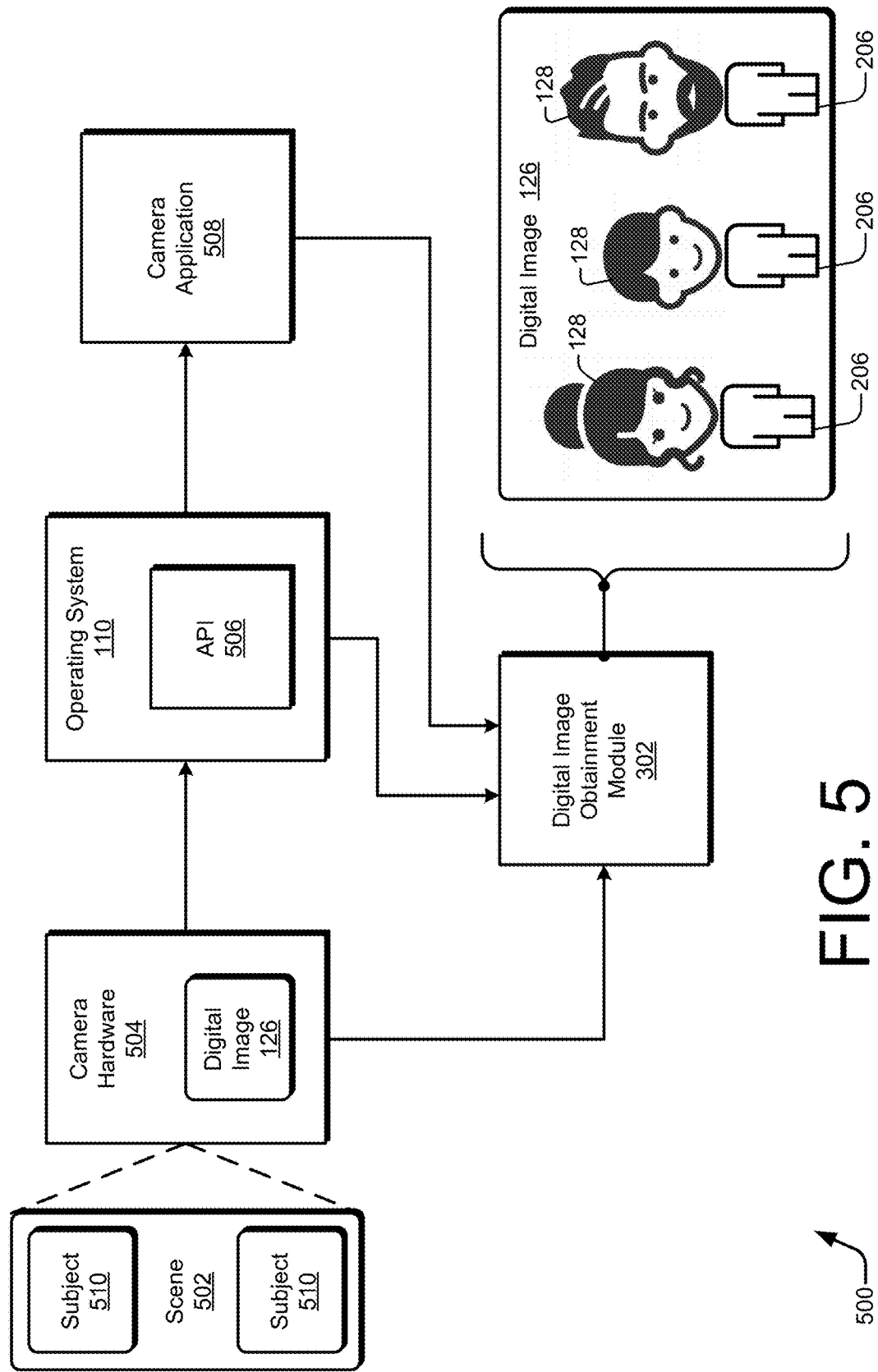
FIG. 5 illustrates an example approach for obtaining a digital image having a visual appearance of a person that is a subject of the digital image.

FIG. 5 illustrates an example approach 500 for obtaining a digital image 126 having a visual appearance of a person 206 that is a subject 510 of the digital image 126. FIG. 5 depicts a scene 502, camera hardware 504, the operating system 110, and a camera application 508. The camera hardware 504 can be integrated with or separate from an end-user computing device (e.g., an end-user implementation of the computing device 102 of FIG. 1).

The camera hardware 504 can include a light sensor and associated processing circuitry. The camera hardware 504 captures the scene 502 that includes at least one subject 510, such as a person 206. The camera hardware 504 captures the scene 502 as the digital image 126 at an original resolution, before or after image processing by the associated circuitry of the camera hardware 504 or other circuitry of the computing device. In some implementations, the camera hardware 504 provides the digital image 126 to the operating system 110. The operating system 110 provides the digital image 126 to the camera application 508. The camera application 508 can acquire the digital image 126 from the camera hardware 504 via, for instance, an application programming interface (API) 506 of the operating system 110.

The digital image obtainment module 302 can obtain the digital image 126 at any location or layer along the logical hierarchical path between the camera hardware 504 and the camera application 508. Thus, the digital image obtainment module 302 can acquire the digital image 126 directly or indirectly from the camera hardware 504. If indirectly, the digital image obtainment module 302 can tap into the operating system 110 via the API 506 or can communicate with the camera application 508 to acquire the digital image 126. In other implementations, the digital image obtainment module 302 can form a portion of the operating system 110 or the camera application 508.

Alternatively, the digital image obtainment module 302 can be located remotely from the camera hardware 504. For example, the digital image obtainment module 302 can be executing on a server computing device at a data center. At the data center, the digital image obtainment module 302 receives the digital image 126 via at least one network, such as the internet, from a remote end-user computing device having the camera hardware 504.

Figure 6:
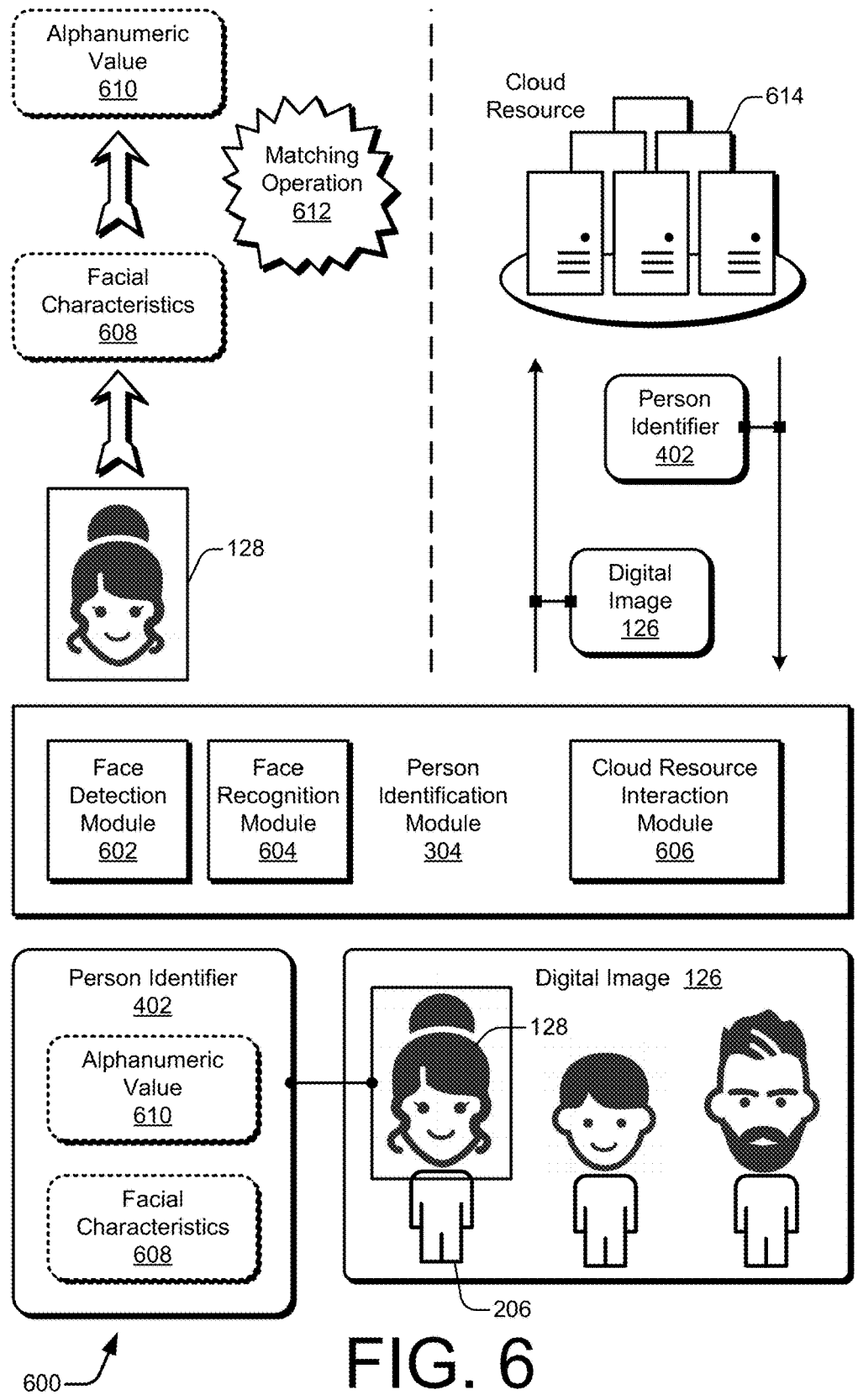
FIG. 6 illustrates an example approach for identifying a person in a digital image using a face thereof.

FIG. 6 illustrates an example approach 600 for identifying a person 206 in a digital image 126 using a face 128 thereof. Generally, the person identification module 304 determines the person identifier 402 corresponding to the person 206 based on a visual appearance of some aspect of the person 206, such as the face 128. The upper half of FIG. 6 is separated into left and right portions by a dashed line. The left and right portions represent different alternative implementations for identifying a person. The person identification module 304 includes a face detection module 602 and a face recognition module 604 that pertain to the left portion or a cloud resource interaction module 606 that pertains to the right portion.

In example implementations corresponding to the upper left portion, the face detection module 602 detects the face 128 of the lady in the digital image 126. The face recognition module 604 is applied to the detected face 128 to extract facial characteristics 608 representative of various physical attributes of the face 128. The facial characteristics 608 can be derived from visual landmarks on a face, such as the shape of the eyes, the nose, or the mouth or such as the relative positions of these landmarks. The facial characteristics 608 can be generated in any manner. For example, a neural network can be applied to the face 128 to generate a feature vector (not shown) representative of the physical attributes of the face 128. The feature vector serves as at least part of the facial characteristics 608.

In some implementations, the person identifier 402 comprises the facial characteristics 608. In other implementations, the person identifier 402 comprises an alphanumeric value 610. The alphanumeric value 610 includes multiple alphabetical or numerical characters that are assigned to a particular face 128 or collection of faces 128 of a given person 206. In operation, the person identification module 304 performs a matching operation 612 to determine the alphanumeric value 610 that is associated with a stored set of facial characteristics that is closest to the facial characteristics 608 derived from the current face 128, with the stored set of facial characteristics representing some combination or average derived from multiple images of the face 128 of the same person 206. The person identifier 402 can also comprise such a combination or average set of facial characteristics. In still other implementations, the person identifier 402 can serve as a pointer to an entry in a listing of contact information.

In example implementations corresponding to the upper right portion of FIG. 6, the cloud resource interaction module 606 relies on a remote cloud resource 614 to determine the person identifier 402. The cloud resource interaction module 606 transmits a copy of the digital image 126 to the remote cloud resource 614 via one or more networks (not shown), such as the internet. The cloud resource 614 can be realized as a data center that manages media, stores files, provides photographic services, provides sharing or collaboration services, some combination thereof, and so forth. The cloud resource 614 can perform operations similar to those described above with regard to face detection and face recognition. The cloud resource 614 returns a person identifier 402 to the person identification module 304. Accordingly, the cloud resource interaction module 606 receives the person identifier 402 from the remote cloud resource 614 via the one or more networks.

Figure 7:
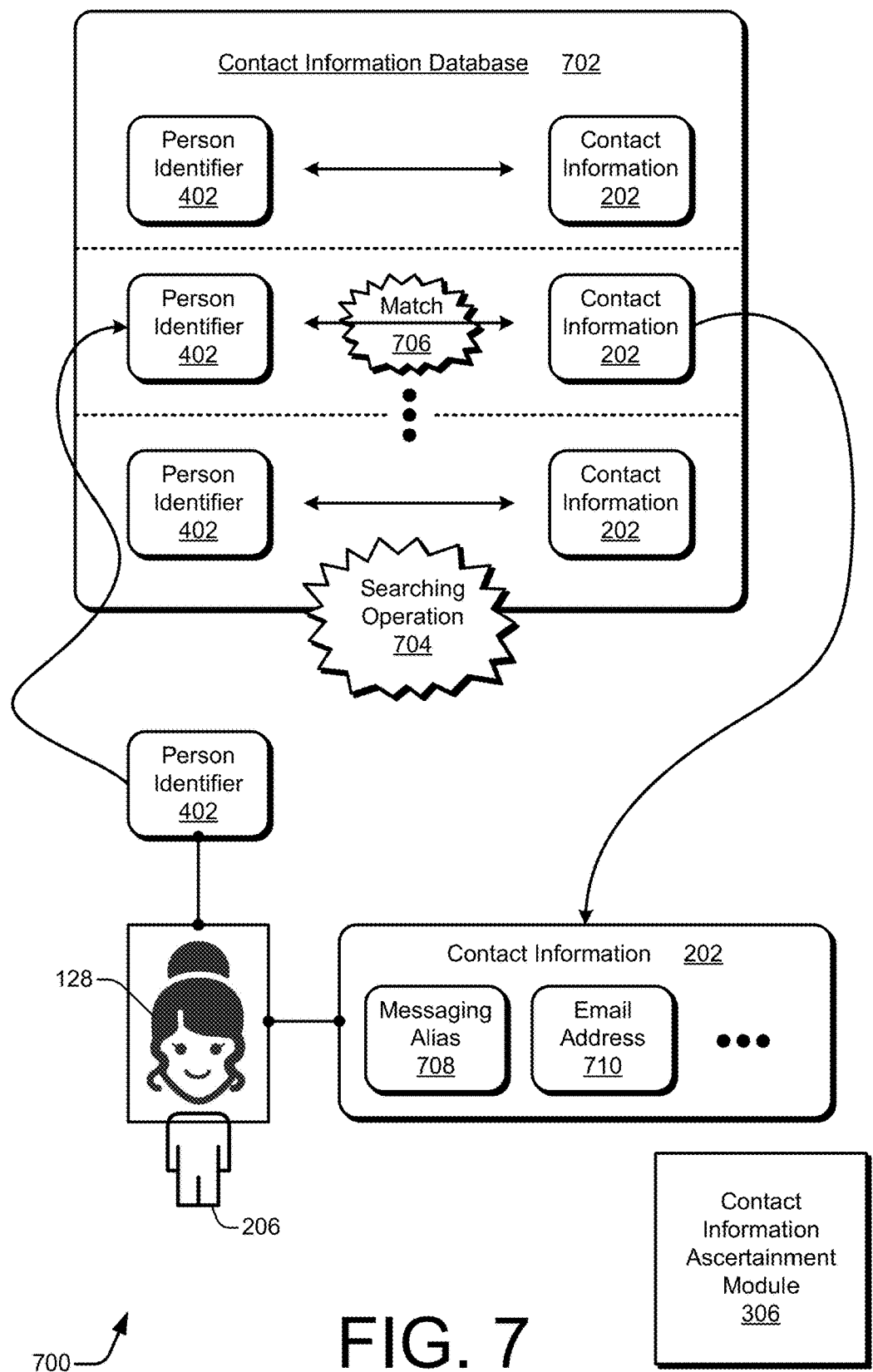
FIG. 7 illustrates an example approach for ascertaining contact information for an identified person.

FIG. 7 illustrates an example approach 700 for ascertaining contact information 202 for an identified person 206. The contact information ascertainment module 306 includes or otherwise has access to a contact information database 702. The contact information database 702 includes multiple entries. Each respective entry associates a respective person identifier 402 with a respective instance of contact information 202. In operation, the contact information ascertainment module 306 performs a searching operation 704 to find an entry that is a match 706 to the person identifier 402 corresponding to the face 128 of the person 206. The contact information database 702 can be implemented, for example, as a relational database with the person identifier 402 serving as a primary key. The matching contact information 202 is extracted by the contact information ascertainment module 306.

The matching contact information 202 can comprise an entire contact card for the person 206 or a portion thereof, such as data designating a destination computing device in accordance with at least one communication channel. Illustrated examples of contact information 202 include a messaging alias 708, an email address 710, and so forth. Another example of the contact information 202 is an identifier—such as a general alias, a username, or the messaging alias 708—linked to a corresponding photo application including a corresponding digital image sharing module 124. The contact information database 702 can be realized in a number of different manners. For example, the contact information database 702 can be realized as a discrete data structure entity that is controlled by the digital image sharing module 124 (e.g., of FIGS. 3 and 4). Such a contact information database 702 stores the contact information 202 together with the associated person identifier 402. For another example, the contact information database 702 can be realized as a distributed data structure in which the contact information 202 is held by a portion of the operating system 110 (e.g., of FIG. 1) or another application. The contact information ascertainment module 306 can ascertain matching contact information 202 by providing the person identifier 402 to the operating system 110 or the other application, with the person identifier 402 comprising an alphanumeric value 610 that includes a name of the person 206 or another value interpreted as the name (e.g., a database entry code). The operating system 110 or the other application then returns current contact information 202 for the identified person 206.

Figure 8:
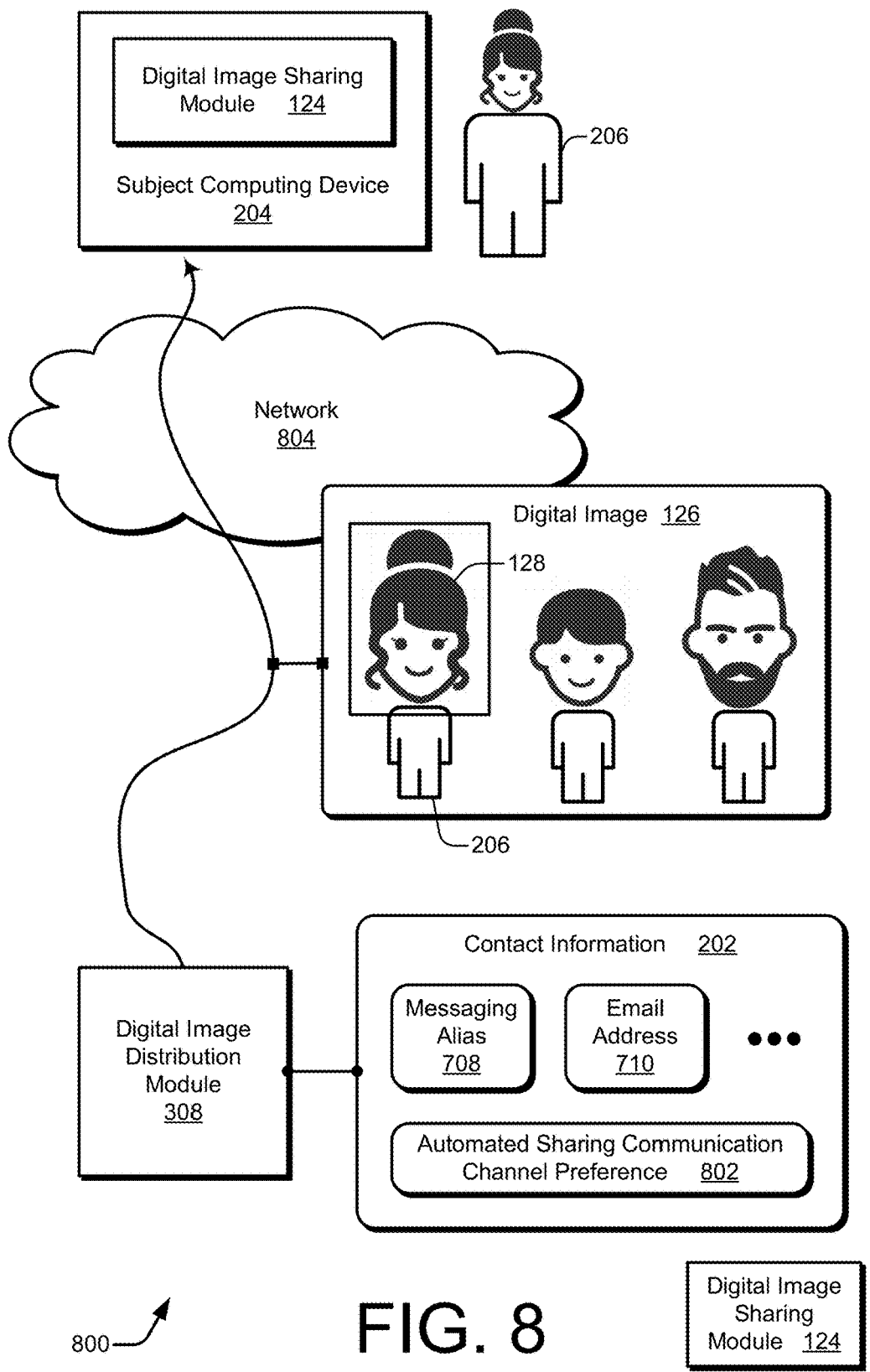
FIG. 8 illustrates an example approach for distributing a copy of a digital image to a subject thereof using the ascertained contact information.

FIG. 8 illustrates an example approach 800 for distributing the digital image 126 to a subject of the digital image, which is the person 206, using the ascertained contact information 202. The digital image distribution module 308 transmits the digital image 126 to the subject computing device 204 via at least one network 804 using the contact information 202 ascertained by the contact information ascertainment module 306. Examples of the network 804 include a public network, a private network, the internet, an intranet, a cellular network, a Wi-Fi network, and combinations thereof.

The digital image distribution module 308 transmits the digital image 126 to a messaging application (not shown) on the subject computing device 204 via, for example, a messaging communication channel using the messaging alias 708. The digital image 126 can be transmitted to one or more subject computing devices 204 of a given person 206 using one or more communication channels enabled by the contact information 202. If more than one communication channel is included in the contact information 202, the digital image distribution module 308 can select a communication channel based on an automated sharing communication channel preference 802. The automated sharing communication channel preference 802 can be stored with the contact information ascertainment module 306 or the digital image distribution module 308. Alternatively, the automated sharing communication channel preference 802 can be stored with individual entries of the contact information 202.

The automated sharing communication channel preference 802 for at least one selected communication channel can be implemented on a global basis or on a per-person basis. If on global basis, selected channel preferences can be indicated with a hierarchical listing in order of priority, such as cloud user account, followed by messaging alias, followed by email address, and so forth. On the other hand, if the selected channel preference is implemented on a per-person basis, an end user 104 (e.g., of FIG. 1) can establish a messaging alias channel preference for her sister and an email address channel preference for her mother. Selected per-person channel preferences can also be ranked. In either case, the end user 104 can set the automated sharing communication channel preference 802 as part of the digital image sharing settings 314 (e.g., of FIG. 3).

Instead of a messaging application destination at a subject computing device 204, the copy of the digital image 126 can be transmitted to a digital image sharing module 124 located at the subject computing device 204, which is shown by way of example at the top of FIG. 8. The transmission can be direct from one module to another module at different client-side computing devices or indirectly via a cloud server that facilitates transmission or synchronization between different digital image sharing modules 124. The digital image sharing module 124 can also offer receptive options as part of the automated sharing communication channel preference 802 or other preferences that are settable by the person 206 of the subject computing device 204. These receptive preferences can indicate whether a received digital image is displayed, where or how the received digital image is stored, some combination thereof, and so forth. By default, a received digital image 126 can be sent directly to an album of a subject computing device 204, such as a smartphone, just as if the digital image 126 was taken by the camera of the smartphone. Additionally or alternatively, the person 206 can specify in which particular album received digital images are to be saved.

Although the approaches illustrated in FIGS. 6-8 are described above primarily with regard to a single person 206 and one face 128, these processes can be repeated or duplicated sequentially or in parallel for multiple such persons 206 and faces 128 that appear in the digital image 126.

Figure 9:
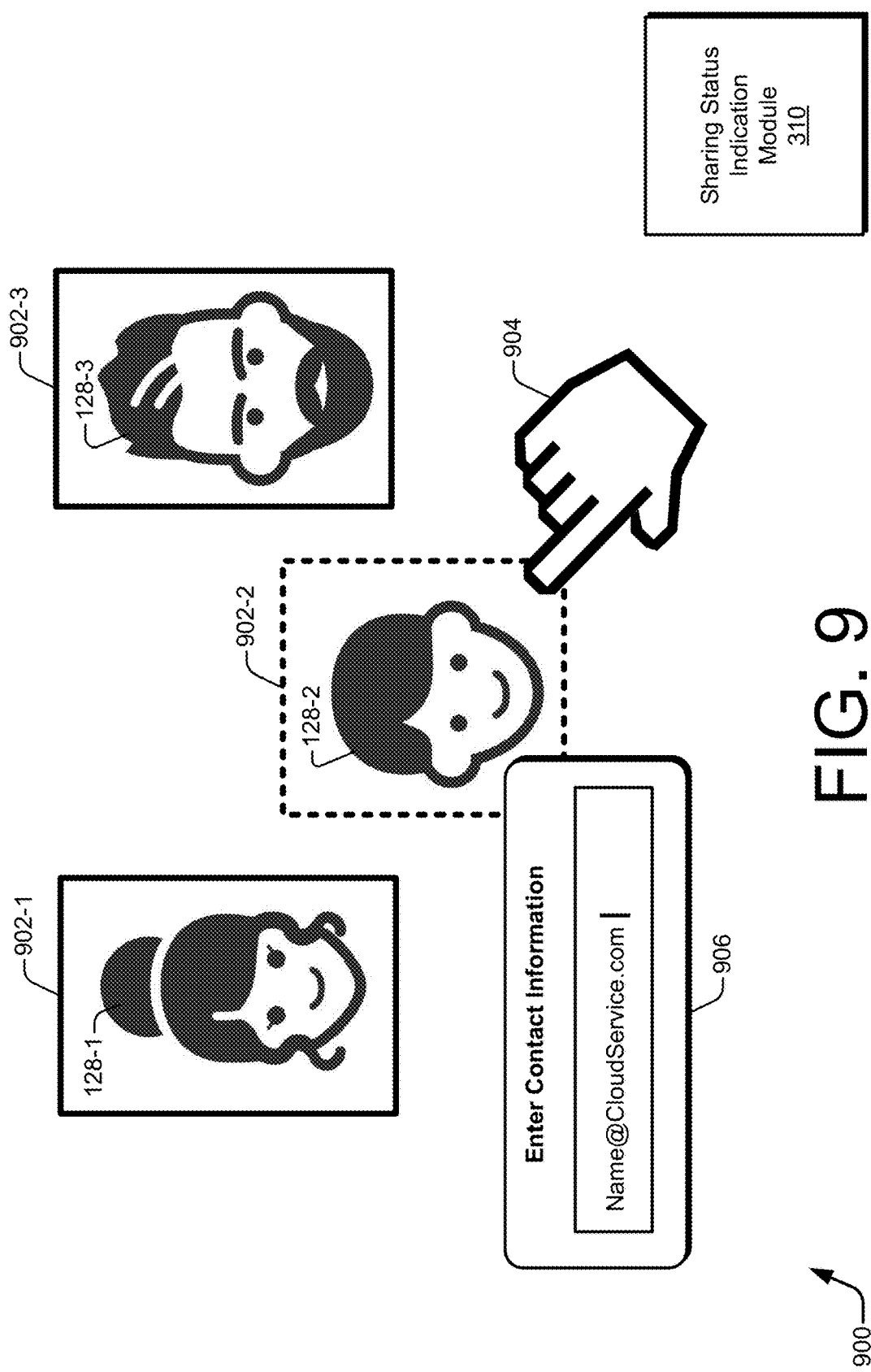
FIG. 9 depicts an example approach for displaying sharing status indicators that are presented with reference to the faces of persons that are subjects of a digital image.

FIG. 9 depicts generally at 900 examples of sharing status indicators 902 that are presented with reference to the faces 128 of persons that are subjects of a digital image. The sharing status indication module 310 visually indicates a current status with regard to automated sharing of the digital image with at least one person of the multiple persons included in the digital image. The sharing status indication module 310 can display a sharing status indicator 902 with reference to a face 128 of a person. A sharing status indicator 902 can be displayed with reference to a face 128 by, for example, partially covering the face, surrounding the face, being at least proximate to the face, pointing to the face, or some combination thereof.

As illustrated, the sharing status indication module 310 displays a rectangle as a sharing status indicator 902. Each detected face is surrounded by a rectangle. If the associated contact information 202 has been ascertained, the rectangle is formed from solid lines. If, on the other hand, no associated contact information 202 has been ascertained, the displayed rectangle is formed from broken or dashed lines. Thus, the sharing status indicators 902-1 and 902-3 visually indicate that contact information has been ascertained for the faces 128-1 and 128-3, respectively. In contrast, the sharing status indicator 902-2 visually indicates that no contact information has been ascertained for the face 128-2.

If no contact information is ascertained for a detected face, there are two possibilities. First, a detected face may not be properly recognized as matching an existing person that has already been trained and included in the automated digital image sharing module. Second, a detected face may not yet have been added to the automated digital image sharing module. In either case, responsive to a user selection as represented by the touch input 904, the sharing status indication module 310 presents a user interface (UI) element that enables an end user to instruct the sharing status indication module 310 to link the face 128-2 to contact information. An example UI element 906 is depicted in FIG. 9. The "Enter Contact Information" block of the UI element 906 accepts user input indicative of the contact information. The contact information can be directly typed in (e.g., for a new face), selected from a scrolling menu (e.g., for a previously trained face), and so forth. Alternatively, a contact information application can be opened that exposes existing contact information for user selection. The newly-labeled face can also be used to update or fine tune the set of facial characteristics corresponding to contact information for a previously trained face.

A sharing status indicator 902 can be implemented in different manners. For example, other shapes can be used, including a mixture of different shapes. Also, different line thicknesses, alternative line patterns, or other colors can be used to display different statuses. Regions around or over a face can be shaded. Further, one or more icons or text can be displayed to indicate a sharing status. For instance, a green oval around a face can represent a successful ascertainment of contact information, and a red oval around a face can represent a failure to ascertain contact information. To further reflect whether a digital image has actually been transmitted, a checkmark can be placed over the top curved portion of a green oval after the digital image has been transmitted.

In example implementations, the sharing status indication module 310 can display the sharing status indicators 902 overlaid on the faces 128 of the actual digital image. Alternatively, the faces 128 can be excised from the remainder of the digital image. The faces 128 can still be rendered in their relative positions in accordance with the digital image, to facilitate locating each person without a background or other visual elements crowding the screen. However, the excised faces 128 can instead be arranged in some ordered manner, such as in a vertical listing or a grid, with each sharing status indicator 902 nevertheless presented with reference to the face 128.

In some example embodiments, prior to transmitting a copy of the digital image 126 to subject computing devices 204 associated with other persons 206 depicted in the digital image 126, and upon ascertaining the identifiable individuals in the digital image 126, the digital image distribution module 308 or the sharing status indication module 310 can cause a visual identifier (e.g., an icon, a pop-up bubble, some text, or a combination thereof) to be presented next to the face 128 or body of each depicted person 206, with the visual identifier including a name, initials, or another type of identification indicative of the person 206. Such embodiments enable the end user 104 to verify that the depicted persons 206 have been properly recognized. Some embodiments may further include the communication channel (e.g., email, short message service (SMS), Apple® Airdrop®, or another type of transmission mechanism) via which the digital image 126 will be sent to each particular person 206. Different individuals may have different preferred mechanisms via which the digital image 126 should be transmitted. The end user 104 may further verify that the automatically-determined or default communication channel via which the digital image 126 is to be transmitted to the different individuals is the same communication channel that is desired by the end user 104.

Further, some embodiments may determine the communication channel to be used to transmit the image based on different individuals' respective devices or corresponding operating systems. Certain embodiments may determine that a particular communication channel of transmission is more efficient, more lossless, more reliable, cheaper, faster, and so forth based on the type of device or operating system or currently-available network options. Such a determined communication channel of transmission can be automatically selected by the digital image distribution module 308 to be the default mechanism of transmission to that device or set as part of the automated sharing communication channel preference 802 (of FIG. 8). The digital image 126 can then be automatically transmitted to different platforms of the different individuals' various devices in the most suitable manner.

Figure 10:
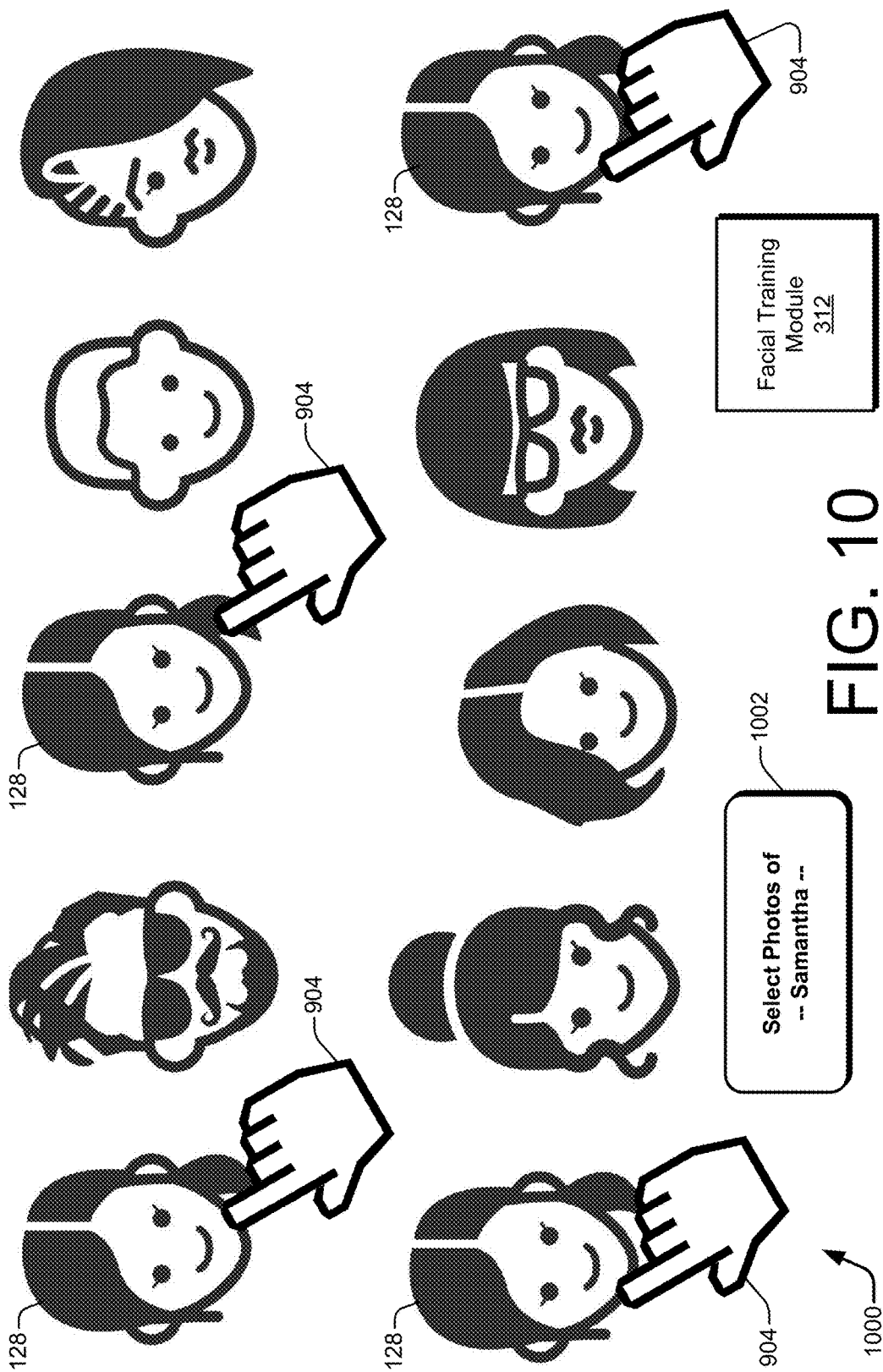
FIG. 10 illustrates an example approach to facial training for the digital image sharing module.

FIG. 10 illustrates an example approach 1000 to implement facial training for the facial training module 312. To facilitate an ability of the digital image sharing module 124 (e.g., of FIGS. 3 and 4) to properly recognize a particular person's face, the facial training module 312 enables an end user to select a number of face samples to represent facial characteristics of the particular person's face. The facial training module 312 then links these face samples to a particular instance of contact information in the contact information database 702 of FIG. 7 responsive to user input.

As illustrated in FIG. 10, an end user has indicated that the facial training module 312 is to be trained to recognize the face of "Samantha." The facial training module 312 displays a UI element 1002 that indicates that currently-selected digital images will be used as samples to represent the face of "Samantha." Multiple digital images are then displayed to the end user (e.g., in an array, sequentially, or via a digital image album), and the end user selects those that correspond to "Samantha." As represented by the touch input 904, the facial training module 312 detects that four faces 128 are to be analyzed and used to represent the face for the contact information of the person "Samantha." The user interaction workflow can be implemented in alternative manners. For example, multiple digital images may be displayed to an end user sequentially. At each digital image of interest to the end user, the end user is empowered to indicate a corresponding instance of contact information. The facial training module 312 then groups each of the digital images that are indicated as corresponding to a particular person and generates a composite set of facial characteristics to represent the particular person.

The user interaction workflows described above are primarily manual. However, a primarily automated approach can be implemented also. For example, the facial training module 312 can inspect multiple digital images in the album of the end use or the computing device thereof. The facial training module 312 detects and recognizes faces. The facial training module 312 then groups digital images by different recognized faces based on probabilistic judgments that certain recognized faces belong to the same person. The end user is then empowered to label each group based on the person or persons shown in the digital images. The facial training module 312 generates a composite set of facial characteristics to represent the designated person and links the set of facial characteristics to the contact information of the designated person.

Having discussed example details of systems, techniques, and schemes for automated sharing of digital images, some example procedures to illustrate additional aspects of the techniques are described below.

Example Procedures

This section describes with reference to FIGS. 11-14 example procedures relating to automated sharing of digital images in one or more implementations. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as an example computing device 102 (of FIG. 1) or 1502 (of FIG. 15) using a digital image sharing module 124 (e.g., of FIGS. 1-4 and 12). Items illustrated in other figures are referred to throughout the description of these procedures.

Figure 11:
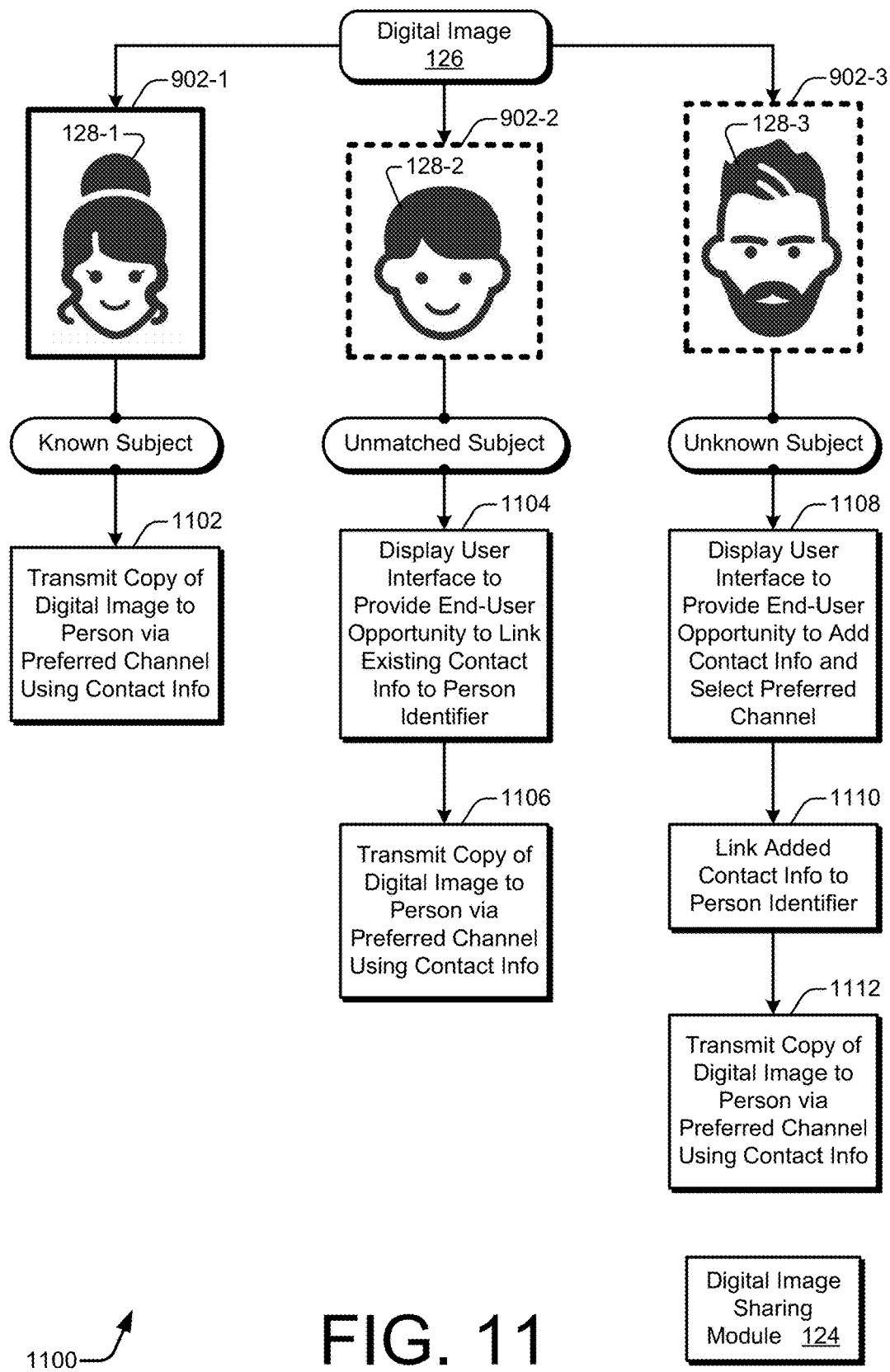
FIG. 11 illustrates example sharing scenarios in which detected persons are successfully matched or unsuccessfully matched.

FIG. 11 illustrates an example procedure 1100 involving multiple sharing scenarios in which detected persons are successfully matched or unsuccessfully matched. In the environment for the procedure 1100, a digital image 126 depicts three faces 128, and three sharing status indicators 902 are displayed, one for each face. Each face 128 corresponds to a respective sharing scenario in the left, middle, and right columns. A first sharing status indicator 902-1 is for a successful matching scenario and has solid lines. Second and third sharing status indicators 902-2 and 902-3 are for unsuccessful matching scenarios in which contact information is not ascertained and therefore have dashed lines.

In the left column, the face 128-1 is for a known subject that the system has been previously trained to recognize. In this case, the face 128-1 in the digital image 126 is recognized, and associated contact information 202 is successfully ascertained. Thus, at operation 1102, the digital image sharing module 124 transmits a copy of the digital image 126 to the corresponding person via a communication channel that comports with the automated sharing communication channel preference 802 (of FIG. 8) using the ascertained contact information 202.

In the middle column, the face 128-2 is also for a subject that the system has been previously trained to recognize, but the matching operation is not successful with the contact information database. This can occur, for instance, if the face 128-2 is depicted in the digital image 126 in such a manner that the extracted facial characteristics deviate too far from the composite set of facial characteristics for the face of the person as trained. Accordingly, at operation 1104, the digital image sharing module 124 displays a UI element 906 (of FIG. 9) to provide to the end user an opportunity to link an existing instance of contact information that is already linked to a composite set of facial characteristics to the current person identifier, which can include multiple facial characteristics, that are extracted from the current face 128-2. Thereafter, at operation 1106, a copy of the digital image 126 is transmitted to the corresponding person via a communication channel that comports with the automated sharing communication channel preference 802 using the linked contact information 202. The composite set of facial characteristics can also be updated.

In the right column, the face 128-3 is for a subject that is unknown to the system, so the matching operation is unsuccessful. This matching failure occurs because the face 128-3 has not yet been trained and is therefore not present in the contact information database. Contact information for the untrained person may or may not be present in the end user's general listing of instances of contact information. Consequently, at operation 1108, the digital image sharing module 124 displays a UI element 906 to provide to the end user an opportunity to add new contact information into the automated sharing system. The digital image sharing module 124 also provides an opportunity to select an automated sharing communication channel preference 802 for the new contact information. At operation 1110, the person identifier, such as multiple facial characteristics, that are extracted from the face 128-3 are linked to the added contact information. And at operation 1112, the digital image sharing module 124 transmits a copy of the digital image 126 to the corresponding person via a communication channel that comports with the automated sharing communication channel preference 802 using the linked contact information 202.

Figure 12:
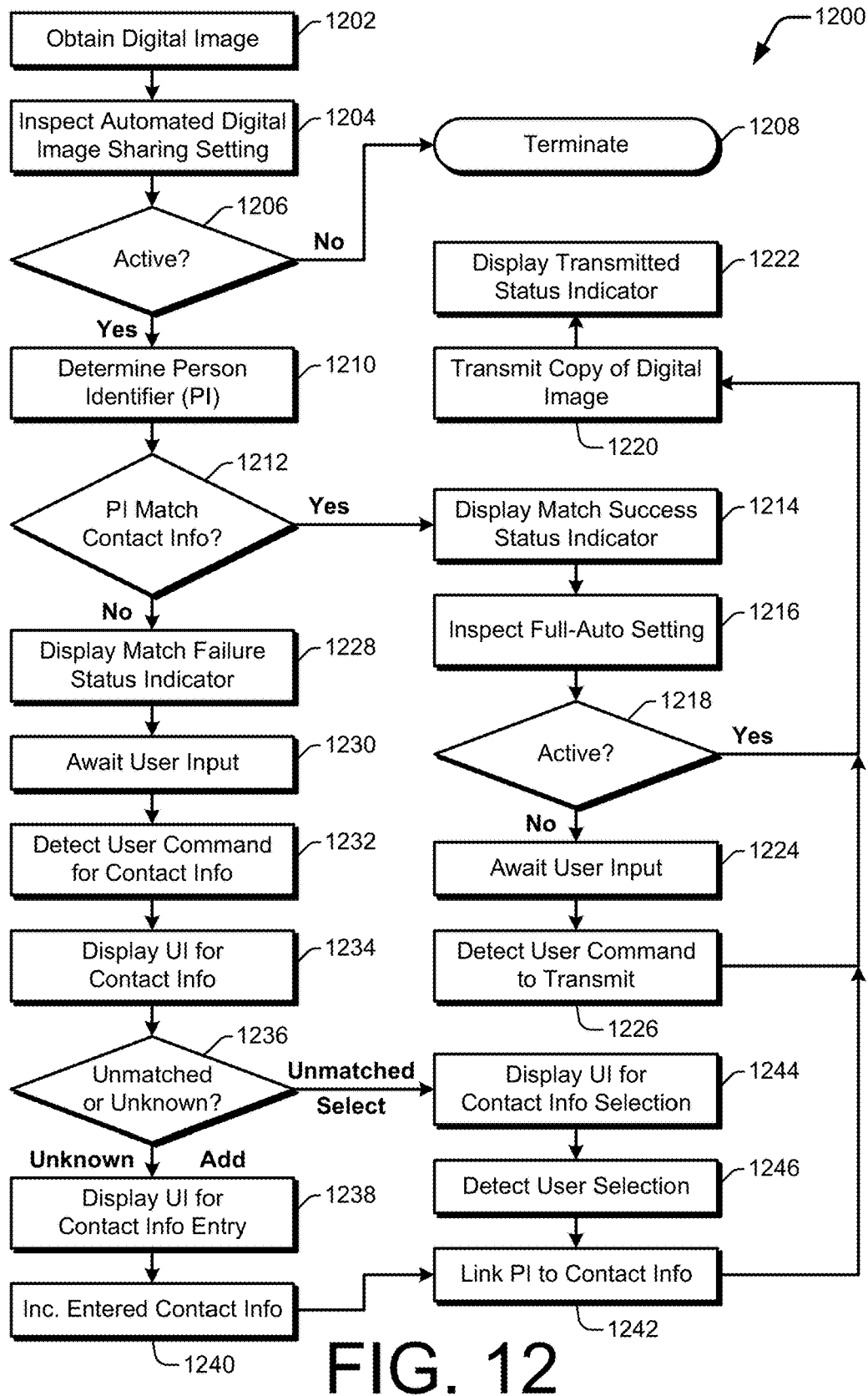
FIG. 12 is a flow chart illustrating an example procedure in accordance with one or more example implementations.

FIG. 12 is a flow chart illustrating an example procedure 1200 in accordance with one or more example implementations. The procedure 1200 includes operations 1202-1246. The flow chart provides a temporal overlay for the approaches described above with reference to FIGS. 5-10 and illustrates an example implementation from a user interaction workflow perspective. The procedure 1200 also demonstrates how user-exposed settings—like the digital image sharing settings 314 of FIG. 3—can guide operation of the user interaction workflow. At operation 1202, the digital image sharing module 124 obtains a digital image 126. At operation 1204, an automated digital image sharing setting is retrieved from memory and inspected.

At operation 1206, the digital image sharing module 124 determines if the automated digital image sharing feature is active based on the setting. If not, then the procedure can terminate at operation 1208. In an alternative implementation, operations 1204 and 1206 are performed prior to operation 1202 such that the digital image is not obtained by the digital image sharing module 124 unless the automated sharing feature is active. If, on the other hand, the automated sharing feature is active, operation 1210 follows operation 1206. At operation 1210, a person identifier (PI), such as the person identifier 402, is determined for a face 128 in the digital image 126.

At operation 1212, the digital image sharing module 124 ascertains if the person identifier 402 matches an instance of contact information 202, such as by searching a contact information database 702. If so, then at operation 1214 the digital image sharing module 124 displays a match success sharing status indicator 902, such as a rectangle formed from a solid yellow line to indicate that contact information has been ascertained. At operation 1216, a fully-automated setting is retrieved from memory and inspected. If the fully-automated setting is active, as checked at operation 1218, then the digital image sharing module 124 transmits a copy of the digital image 126 to a subject computing device 204 of the corresponding person 206 at operation 1220.

At operation 1222, responsive to the digital image transmission of operation 1220, a transmission-successful sharing status indicator 902 is displayed. For example, the yellow-lined rectangle can be converted to a green-lined rectangle to indicate that the digital image 126 has been shared with the referenced person 206. If the fully-automated setting is not determined to be active at operation 1218, then at operation 1224 the digital image sharing module 124 awaits user input. At operation 1226, the digital image sharing module 124 detects a user command to transmit the digital image 126. For example, detection of a long press on the yellow-lined rectangle can initiate transmission. Responsive to the detection, the procedure 1200 continues at operation 1220 as described above.

Returning to the operation 1212, if the determined person identifier 402 is not ascertained to match any contact information 202, then at operation 1228 the digital image sharing module 124 displays a match failure sharing status indicator 902. For example, a rectangle formed from red dashed lines can be displayed to indicate that no matching contact information was ascertained. At operation 1230, user input is awaited. A user command, such as a touch on the red dashed-line rectangle, that is indicative of a request for a contact information menu is detected at operation 1232. At operation 1234, the digital image sharing module 124 displays a UI menu for contact information. The UI menu for contact information presents options for an end user to select an existing contact or add a new contact.

At operation 1236, the digital image sharing module 124 detects if the end user indicates that the face is for a previously unknown person or is for a known, but unsuccessfully matched, person. If for an unknown person, the digital image sharing module 124 displays a UI element 906 enabling the end user to enter new contact information data at operation 1238 by typing in the data or referencing existing contact information data in a general listing of instances of contact information. At operation 1240, the newly-entered contact information data is incorporated into the automated sharing system, such as by adding the data to the overall contact information 202 for the end user or the computing device 102 thereof or by linking to or extracting from such overall contact information 202.

At operation 1242, the digital image sharing module 124 links the newly incorporated instance of contact information 202 to the person identifier 402 in the contact information database 702. The procedure 1200 then continues at operation 1220 to transmit a copy of the digital image 126. If, on the other hand, the digital image sharing module 124 detects that the end user is indicating that the face is for a known but unmatched person at operation 1236, then at operation 1244 the digital image sharing module 124 displays a UI element 906 enabling the end user to select existing contact information 202 that is already present in the contact information database 702. At operation 1246, user selection of the existing instance of contact information 202 is detected. At operation 1242, the digital image sharing module 124 links the existing instance of contact information 202 to the person identifier 402 in the contact information database 702, and the procedure 1200 continues at operation 1220.

Figure 13:
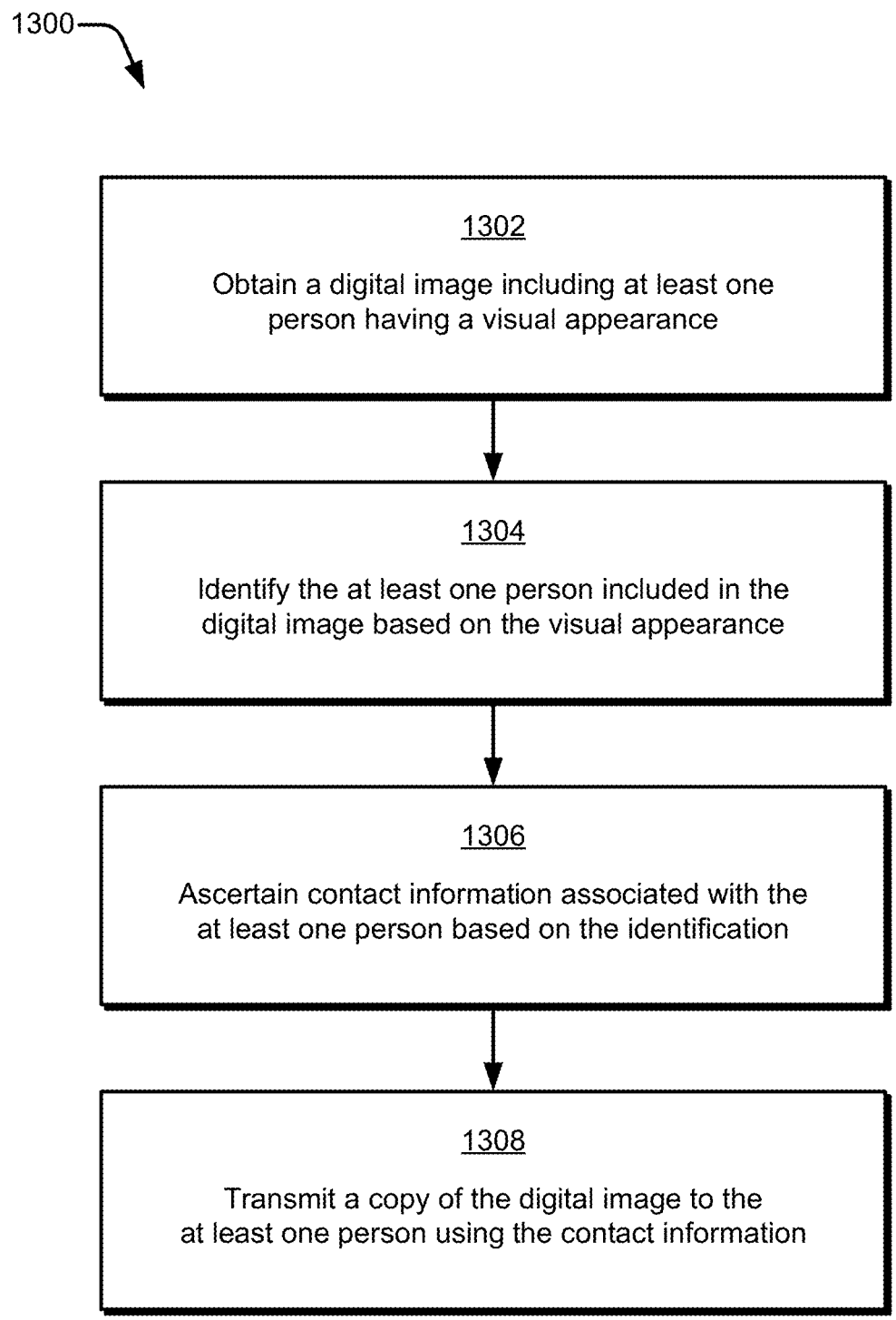
FIG. 13 is a flow diagram illustrating an example procedure in accordance with one or more example implementations.

FIG. 13 is a flow diagram that includes four blocks 1302-1308 and that illustrates an example procedure 1300 for automated sharing of digital images in accordance with one or more example implementations. At block 1302, a computing device 102 obtains a digital image including at least one person having a visual appearance. For example, a digital image sharing module 124 can obtain a digital image 126 including at least one person 206 having a visual appearance. A digital image obtainment module 302, for instance, may detect or be informed that a new digital image 126 has been captured and acquire access to the digital image 126.

At block 1304, the computing device 102 identifies the at least one person included in the digital image based on the visual appearance. For example, the digital image sharing module 124 can identify the at least one person 206 included in the digital image 126 based on the visual appearance. To do so, a person identification module 304 may perform a facial recognition operation on a face 128 detected in the digital image 126 to determine multiple facial characteristics that serve as a person identifier 402 of the person 206 or may receive a person identifier 402 from a remote cloud resource.

At block 1306, the computing device 102 ascertains contact information associated with the at least one person based on the identifying. For example, the digital image sharing module 124 can ascertain contact information 202 associated with the at least one person 206 based on the identification of the person. Acts that may be performed by, for instance, a contact information ascertainment module 306 to ascertain instances of contact information 202 are described above with reference to, e.g., FIGS. 7, 11, and 12.

At block 1308, the computing device 102 transmits a copy of the digital image to the at least one person using the contact information. For example, the digital image sharing module 124 can transmit a copy of the digital image 126 to the at least one person 206 using the contact information 202. Acts that may be performed by, for instance, a digital image distribution module 308 to transmit a copy of the digital image 126 to the person 206 are described above with reference to, e.g., FIGS. 8, 11, and 12.

Figure 14:
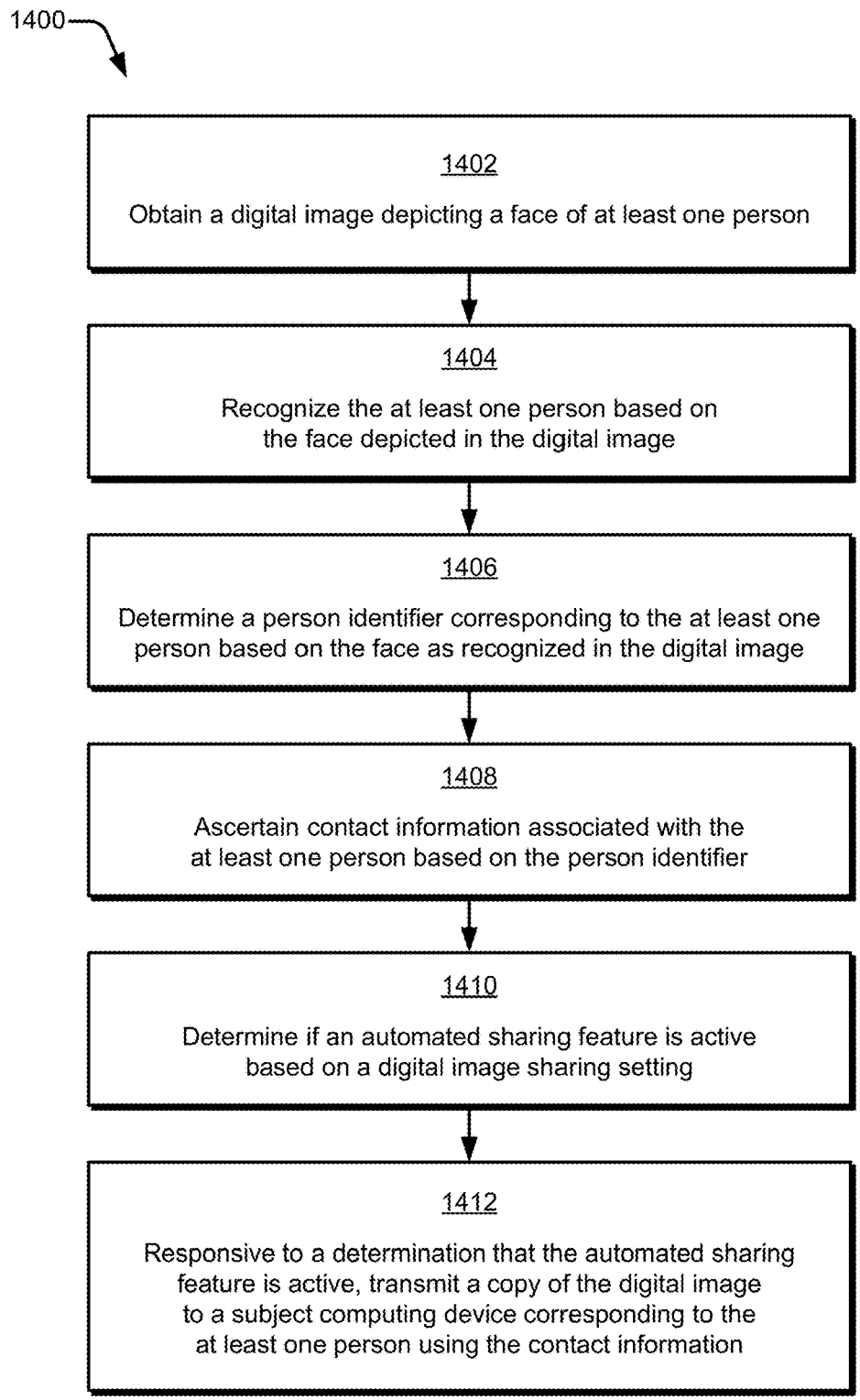
FIG. 14 is another flow diagram illustrating another example procedure in accordance with one or more example implementations.

FIG. 14 is a flow diagram that includes six blocks 1402-1412 and that illustrates an example procedure 1400 for automated sharing of digital images in accordance with one or more example implementations. At block 1402, a computing device 102 obtains a digital image depicting a face of at least one person. For example, a digital image sharing module 124 can obtain a digital image 126 depicting a face 128 of at least one person 206. A digital image obtainment module 302 may acquire from a camera application 508 or an operating system 110, for instance, a digital image 126 comprising a group digital image 126 that includes multiple persons 206 respectively having multiple faces 128.

At block 1404, the computing device 102 recognizes the at least one person based on the face depicted in the digital image. For example, the digital image sharing module 124 can recognize the at least one person 206 based on the face 128 depicted in the digital image 126. To do so, a face recognition module 604 of a person identification module 304 may apply a convolutional neural network to the visual appearance of the face 128 to extract a feature vector representative of one or more facial characteristics 608.

At block 1406, the computing device 102 determines a person identifier corresponding to the at least one person based on the face as recognized in the digital image. For example, the digital image sharing module 124 can determine a person identifier 402 corresponding to the at least one person 206 based on the face 128 as recognized in the digital image 126. The person identification module 304 may derive the person identifier 402 from the one or more facial characteristics 608.

At block 1408, the computing device 102 ascertains contact information associated with the at least one person based on the person identifier. For example, the digital image sharing module 124 can ascertain contact information 202 associated with the at least one person 206 based on the person identifier 402. A contact information ascertainment module 306 of the digital image sharing module 124 may search a contact information database 702 that respectively links person identifiers 402 with instances of contact information 202 using the determined person identifier 402 as a primary key.

At block 1410, the computing device 102 determines if an automated sharing feature is active based on a digital image sharing setting. For example, the digital image sharing module 124 can determine if an automated sharing feature is active based on a digital image sharing setting 314 that is stored in memory. From the perspective of an end user, a sliding or toggle switch for the digital image sharing setting 314 may be located in a settings menu for an application or the operating system. In some implementations, the automated sharing feature can be activated in a partially automated mode such that the sharing is triggered in response to a user indication to share or send the digital image 126 to other persons 206 in the digital image 126. For example, such a user indication can be detected if the end user 104 selects a "send to others in the picture" button, performs a certain type of gesture on the screen (e.g., a flick directed at the photo), provides another touch input 904, and so forth.

At block 1412, responsive to a determination that the automated sharing feature is active, the computing device 102 transmits a copy of the digital image to a subject computing device corresponding to the at least one person using the contact information. For example, responsive to a determination at block 1410 that the automated sharing feature is active, the digital image sharing module 124 can transmit a copy of the digital image 126 to a subject computing device 204 corresponding to the at least one person 206 using the contact information 202. A digital image distribution module 308 can operate in a fully automated mode or in a partially automated mode in which an end user 104 authorizes the transmission of the copy of the digital image 126. Although not explicitly illustrated in FIG. 14, any one or more of the operations of the blocks 1402-1408 can additionally or alternatively be performed conditionally on a result of the operation of the block 1410.

Having described example procedures in accordance with one or more implementations, an example system and devices are presented below that can be utilized to implement the various schemes and techniques described herein.

Example System and Device

Figure 15:
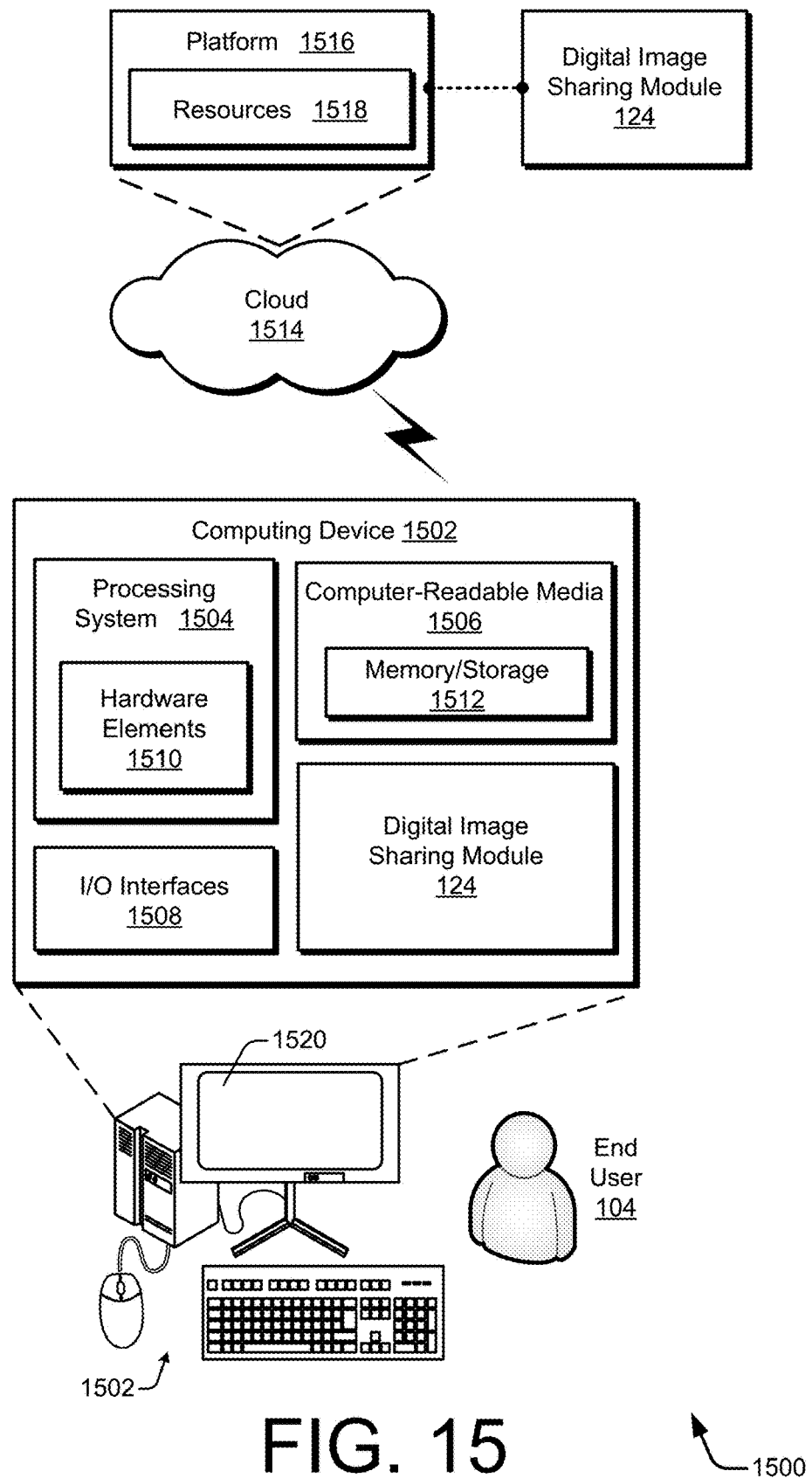
FIG. 15 illustrates an example system including various components of example devices that can be employed for one or more implementations of automated sharing of digital images.

FIG. 15 illustrates generally at 1500 an example system including an example computing device 1502 representative of one or more computing systems or computing devices that may implement the various techniques described herein. This is depicted through the inclusion of a digital image sharing module 124, which may operate as described herein above. A computing device 1502 may be implemented as, for example, a computing device 102 (of FIG. 1) in an independent or standalone mode. The computing device 1502 can display a digital image or a sharing status indicator to the end user 104 via a display screen 1520. Generally, a computing device 1502 may be implemented as, for example, an end user device (e.g., a smart phone or desktop computer) of an end user 104, a corporate device (e.g., a server side device or data center hardware) of a business, an on-chip system or system-on-a-chip (SOC) (e.g., that is integrated with a tablet device or a display device), or any other suitable computing device or computing system.

In an example implementation as shown in FIG. 1, the digital image sharing module 124 is executing at one location (e.g., within a housing of the computing device 102 or a subject computing device 204). However, the digital image sharing module 124 can alternatively be executing in the cloud (e.g., on a network-side computing device) if bandwidth is sufficiently large or transmission latency is sufficiently small, and such an example implementation as also shown in FIG. 15. Alternatively, a portion of the digital image sharing module 124 can be executing at both a client-side computing device and a server-side computing device. In such an implementation, the operations implemented by the digital image sharing module 124 as described herein may be distributed across a client-server architecture.

The example computing device 1502 as illustrated includes at least one processing system 1504, one or more computer-readable media 1506, and one or more I/O interfaces 1508 that may be communicatively coupled, one to another. Although not explicitly shown, the computing device 1502 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including one or more hardware elements 1510 that may be implemented as processors, functional blocks, and so forth. This may include implementation in hardware as an application specific integrated circuit (ASIC), a general-purpose processor, or other logic device formed using e.g. one or more semiconductors. The hardware elements 1510 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (e.g., random access memory (RAM)) or nonvolatile media (e.g., read only memory (ROM), flash memory, optical discs, or magnetic disks). The memory/storage component 1512 may include fixed media (e.g., RAM, ROM, or a fixed hard drive) or removable media (e.g., a flash memory card, a removable hard drive, or an optical disc). The computer-readable media 1506 may be implemented in a variety of other ways as further described below.

The input/output interface(s) 1508 are representative of functionality to allow a user to enter commands or information to computing device 1502 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1502 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An implementation of the described modules, and techniques thereof, may be stored on or transmitted across some form of computer-readable media. The computer-readable media 1506 may include a variety of media that may be accessed by the computing device 1502. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer-readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1502, such as via a network. Computer-readable signal media may typically embody computer-readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1510 or computer-readable media 1506 may be representative of modules, programmable device logic, fixed device logic, a combination thereof, and so forth that are implemented in a hardware form that may be employed in some implementations to realize at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1510. The computing device 1502 may be configured to implement particular instructions or functions corresponding to software or hardware modules. Accordingly, implementation of a module that is executable by the computing device 1502 as software may be achieved at least partially in hardware, e.g., through use of computer-readable storage media or the hardware elements 1510 of the processing system 1504. The instructions or functions may be executable/operable by one or more articles of manufacture (e.g., one or more computing devices 1502 or processing systems 1504) to implement techniques, modules, or examples described herein.

The techniques described herein may be supported by various configurations of the computing device 1502 and are not limited to the specific aspects of the example devices described herein. This functionality may also be implemented fully or partially through use of a distributed system, such as over a "cloud" 1514 via a platform 1516 as described below.

The cloud 1514 may include or represent a platform 1516 for resources 1518. The platform 1516 abstracts underlying functionality of hardware (e.g., one or more servers or at least one data center) and software resources of the cloud 1514. The resources 1518 may include applications or data that can be utilized while computer processing is at least partially executed on servers remote from, or distributed around, the computing device 1502. Resources 1518 may also include services provided over the internet or through a subscriber network, such as a cellular or Wi-Fi network.

The platform 1516 may abstract resources and functions to connect the computing device 1502 with other computing devices or services. The platform 1516 may also serve to abstract a scaling of resources to provide a corresponding level of scale to encountered demand for the resources 1518 implemented via the platform 1516. Accordingly, in an interconnected device embodiment, implementation of functionality described herein may be distributed throughout the illustrated system of FIG. 15, or at least throughout the cloud 1514 along with the computing device 1502. For example, functionality may be implemented in part on the computing device 1502 as well as via the platform 1516 that abstracts the functionality of the cloud 1514.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment in which digital images are to be electronically shared with subjects of the digital images using an automated mechanism, a method implemented by at least one computing device, the method comprising:
   obtaining, by the at least one computing device, a digital image including at least one person having a visual appearance;
   identifying, by the at least one computing device, the at least one person included in the digital image based on the visual appearance;
   ascertaining, by the at least one computing device, contact information associated with the at least one person based on the identifying;
   determining, by the at least one computing device, whether an automated sharing feature for electronically sharing the digital images is active; and
   responsive to determining that the automated sharing feature is active, automatically transmitting, by the at least one computing device, a copy of the digital image to the at least one person using the contact information without a contemporaneous authorization by a user.

2. The method of claim 1, wherein the ascertaining comprises searching a contact information database to ascertain the contact information that matches a person identifier derived from the visual appearance of the at least one person.

3. The method of claim 1, wherein the transmitting comprises transmitting the copy of the digital image at an original resolution to the at least one person using a private communication channel.

4. The method of claim 1, further comprising:
   indicating on a display screen a sharing status corresponding to the at least one person, the sharing status displayed with reference to the visual appearance of the at least one person.

5. The method of claim 1, further comprising:
   training an executable module to link recognized faces of respective persons to respective instances of contact information.

6. At least one computing device operative in a digital medium environment in which digital images are to be electronically shared with subjects of the digital images using an automated mechanism, the at least one computing device including a processing system and at least one computer-readable storage medium, the at least one computing device comprising:
> a digital image obtainment module implemented at least partially in hardware of the at least one computing device configured to obtain a digital image depicting multiple faces of multiple persons included in the digital image;
> a person identification module implemented at least partially in hardware of the at least one computing device configured to determine a person identifier corresponding to each respective person of the multiple persons based on a visual appearance of a respective face of the multiple faces;
> a contact information ascertainment module implemented at least partially in hardware of the at least one computing device configured to ascertain an instance of contact information associated with each respective person based on the person identifier corresponding to the respective person; and
> a digital image distribution module implemented at least partially in hardware of the at least one computing device configured to:
>> determine whether an automated sharing feature for electronically sharing the digital images is active; and
>> in response to determining that the automated sharing feature is active, transmit a copy of the digital image to a subject computing device corresponding to each respective person using the instance of contact information associated with the respective person without a contemporaneous authorization by a user.

7. The at least one computing device of claim 6, wherein:
> the at least one computing device comprises at least part of a data center; and
> the digital image obtainment module is configured to receive the digital image from a remote end-user computing device via the internet.

8. The at least one computing device of claim 6, wherein:
> the at least one computing device comprises an end-user computing device; and
> the digital image obtainment module is configured to acquire the digital image from camera hardware that is integrated with the end-user computing device.

9. The at least one computing device of claim 6, wherein the person identification module comprises:
> a face detection module configured to detect the multiple faces depicted in the digital image; and
> a face recognition module configured to extract multiple facial characteristics of each respective face of the multiple faces based on the visual appearance of the respective face, the person identifier that corresponds to each respective person derived from the extracted multiple facial characteristics of the respective face of each respective person.

10. The at least one computing device of claim 6, wherein the person identification module comprises a cloud resource interaction module configured to:
> transmit to a remote cloud resource the digital image; and
> receive from the remote cloud resource the person identifier corresponding to each respective person of the multiple persons.

11. The at least one computing device of claim 6, wherein the contact information ascertainment module is configured to search a contact information database to ascertain the instance of contact information that matches the person identifier corresponding to each respective person of the multiple persons.

12. The at least one computing device of claim 6, wherein the digital image distribution module is configured to transmit the copy of the digital image to the subject computing device corresponding to each respective person based on an automated sharing communication channel preference indicative of at least one selected communication channel for automatically transmitting digital images.

13. The at least one computing device of claim 6, further comprising:
> a sharing status indication module configured to visually indicate a current status with respect to automated sharing of the digital image with at least one person of the multiple persons included in the digital image.

14. The at least one computing device of claim 13, wherein the sharing status indication module is configured to display a sharing status indicator for each respective person of the multiple persons overlaid on the digital image and with reference to each respective face of the multiple faces depicted in the digital image.

15. The at least one computing device of claim 14, wherein the sharing status indication module is configured to display the sharing status indicator so as to visually indicate whether contact information has been ascertained for each face of the multiple faces on a per-person basis.

16. The at least one computing device of claim 6, further comprising:
> a facial training module configured to:
>> receive a user control signal based on user input, the user control signal indicative of a linkage between a face of a particular person and contact information associated with the particular person; and
>> link a person identifier corresponding to the particular person to the contact information in a contact information database.

17. In a digital medium environment in which digital images are to be electronically shared with subjects of the digital images using an automated mechanism, at least one computer-readable medium storing processor-executable instructions that, responsive to execution by a processing system, cause at least one computing device to perform operations comprising:
> obtaining a digital image depicting a face of at least one person;
> recognizing the at least one person based on the face depicted in the digital image;
> determining a person identifier corresponding to the at least one person based on the face as recognized in the digital image;
> ascertaining contact information associated with the at least one person based on the person identifier;
> determining if an automated sharing feature is active based on a digital image sharing setting; and
> responsive to a determination that the automated sharing feature is active, transmitting a copy of the digital image to a subject computing device corresponding to the at least one person using the contact information without receiving contemporaneous input from an end user operating the at least one computing device.

18. The at least one computer-readable medium of claim 17, wherein the operations further comprise:
> displaying a sharing status indicator over the digital image, the sharing status indicator indicative of a failure to ascertain the contact information for the at least one person;

accepting user input indicative of the contact information associated with the at least one person; and linking the person identifier to the contact information in a contact information database.

19. The at least one computer-readable medium of claim 17, wherein the operations further comprise displaying a sharing status indicator with reference to the face of the at least one person, the sharing status indicator indicative of a successful sharing of the digital image with the at least one person.

20. The at least one computer-readable medium of claim 17, further comprising:

determining whether a partially-automated sharing feature is active; and responsive to a determination that the partially-automated sharing feature is active, performing one or more of the ascertaining or transmitting the copy of the digital image to a subject computing device corresponding to the at least one person using the contact information following a contemporaneous authorization by the end user.

* * * * *